US011915698B1

(12) United States Patent
Lee et al.

(10) Patent No.: US 11,915,698 B1
(45) Date of Patent: Feb. 27, 2024

(54) SOUND SOURCE LOCALIZATION

(71) Applicant: Amazon Technologies, Inc., Seattle, WA (US)

(72) Inventors: Borham Lee, Sunnyvale, CA (US); Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 17/489,223

(22) Filed: Sep. 29, 2021

(51) Int. Cl.
*G10L 15/22* (2006.01)
*G10L 15/10* (2006.01)

(52) U.S. Cl.
CPC ............. *G10L 15/22* (2013.01); *G10L 15/10* (2013.01)

(58) Field of Classification Search
CPC ................................ G10L 15/22; G10L 15/10
USPC ........................................................ 704/275
See application file for complete search history.

(56) References Cited

U.S. PATENT DOCUMENTS

| | | | | | |
|---|---|---|---|---|---|
| 6,009,391 | A | * | 12/1999 | Asghar | G10L 15/20 704/238 |
| 7,774,202 | B2 | * | 8/2010 | Spengler | G10L 15/22 704/241 |
| 9,836,048 | B1 | * | 12/2017 | Widmaier | B63H 21/21 |
| 10,083,689 | B2 | * | 9/2018 | Bocklet | G10L 15/08 |
| 10,147,432 | B2 | * | 12/2018 | Fuchs | G10L 19/012 |
| 10,152,973 | B2 | * | 12/2018 | Hoffmeister | G10L 15/22 |
| 10,163,455 | B2 | * | 12/2018 | VanBlon | G10L 25/87 |
| 10,276,161 | B2 | * | 4/2019 | Hughes | G10L 15/22 |
| 10,339,958 | B2 | * | 7/2019 | Braskich | G10L 25/51 |
| 10,573,321 | B1 | * | 2/2020 | Smith | H04R 29/004 |
| 10,573,323 | B2 | * | 2/2020 | Huang | G10L 17/26 |
| 10,580,405 | B1 | * | 3/2020 | Wang | G10L 15/30 |
| 10,593,328 | B1 | * | 3/2020 | Wang | H04L 65/1059 |
| 10,657,953 | B2 | * | 5/2020 | Park | G10L 15/063 |
| 10,692,499 | B2 | * | 6/2020 | Lim | G10L 15/18 |
| 10,748,529 | B1 | * | 8/2020 | Milden | G06F 3/167 |
| 10,777,193 | B2 | * | 9/2020 | Lee | G10L 15/32 |
| 11,038,934 | B1 | * | 6/2021 | Hansen | H04L 65/1069 |
| 11,380,312 | B1 | * | 7/2022 | Mansour | G10L 15/08 |
| 2005/0273328 | A1 | * | 12/2005 | Padhi | G10H 1/40 704/239 |
| 2009/0319267 | A1 | * | 12/2009 | Kurki-Suonio | G10L 15/26 704/235 |
| 2011/0087492 | A1 | * | 4/2011 | Yoshida | G10L 15/08 704/E15.001 |

(Continued)

*Primary Examiner* — Thuykhanh Le
(74) *Attorney, Agent, or Firm* — Pierce Atwood LLP

(57) ABSTRACT

A system configured to improve track selection while performing audio type detection using sound source localization (SSL) data is provided. A device processes audio data representing sounds from multiple sound sources to determine SSL data that distinguishes between each of the sound sources. The system detects an acoustic event and performs SSL track selection to select the sound source that corresponds to the acoustic event based on input features. To improve SSL track selection, the system detects current conditions of the environment and determines adaptive weight values that vary based on the current conditions, such as a noise level of the environment, whether playback is detected, whether the device is located near one or more walls, etc. By adjusting the adaptive weight values, the system improves an accuracy of the SSL track selection by prioritizing the input features that are most predictive during the current conditions.

20 Claims, 15 Drawing Sheets

(56) References Cited

U.S. PATENT DOCUMENTS

| | | | | |
|---|---|---|---|---|
| 2011/0112837 A1* | 5/2011 | Kurki-Suonio | | G10L 15/22 |
| | | | | 704/235 |
| 2012/0215537 A1* | 8/2012 | Igarashi | | H04N 21/42204 |
| | | | | 704/E15.004 |
| 2013/0060571 A1* | 3/2013 | Soemo | | G06F 3/011 |
| | | | | 704/E15.001 |
| 2013/0339028 A1* | 12/2013 | Rosner | | G10L 15/22 |
| | | | | 704/E11.001 |
| 2014/0222436 A1* | 8/2014 | Binder | | G10L 21/16 |
| | | | | 704/275 |
| 2014/0237277 A1* | 8/2014 | Mallinson | | G06F 1/3231 |
| | | | | 713/323 |
| 2015/0039310 A1* | 2/2015 | Clark | | G10L 15/063 |
| | | | | 704/244 |
| 2015/0127353 A1* | 5/2015 | Cho | | G06F 3/167 |
| | | | | 704/275 |
| 2015/0162002 A1* | 6/2015 | Liu | | G10L 15/1822 |
| | | | | 704/235 |
| 2016/0267908 A1* | 9/2016 | Borjeson | | G10L 25/84 |
| 2017/0155378 A1* | 6/2017 | Hu | | G06F 1/324 |
| 2017/0206243 A1* | 7/2017 | Ono | | G06F 16/24578 |
| 2017/0256270 A1* | 9/2017 | Singaraju | | G10L 25/21 |
| 2018/0224812 A1* | 8/2018 | Qu | | H04L 12/2816 |
| 2018/0293999 A1* | 10/2018 | Walley | | G10L 25/21 |
| 2018/0324518 A1* | 11/2018 | Dusan | | G06F 3/167 |
| 2019/0043488 A1* | 2/2019 | Bocklet | | G10L 15/22 |
| 2019/0304458 A1* | 10/2019 | Chi | | G06F 3/165 |
| 2019/0304460 A1* | 10/2019 | Gunn | | G06F 1/3265 |
| 2020/0126565 A1* | 4/2020 | Kim | | G10L 15/22 |
| 2020/0184964 A1* | 6/2020 | Myers | | G06F 3/167 |
| 2020/0184966 A1* | 6/2020 | Yavagal | | G10L 15/30 |
| 2021/0074290 A1* | 3/2021 | Choi | | G10L 15/22 |
| 2022/0036896 A1* | 2/2022 | Elkhatib | | G10L 25/30 |
| 2022/0093095 A1* | 3/2022 | Dighe | | G10L 15/26 |
| 2022/0335948 A1* | 10/2022 | Leong | | G10L 15/22 |
| 2022/0392481 A1* | 12/2022 | Chen | | G10L 25/51 |
| 2022/0406298 A1* | 12/2022 | Guarneri | | G10L 25/21 |
| 2023/0086579 A1* | 3/2023 | Kim | | G06F 3/167 |
| | | | | 704/246 |
| 2023/0101966 A1* | 3/2023 | Mittal | | G10L 25/51 |
| | | | | 381/56 |

* cited by examiner

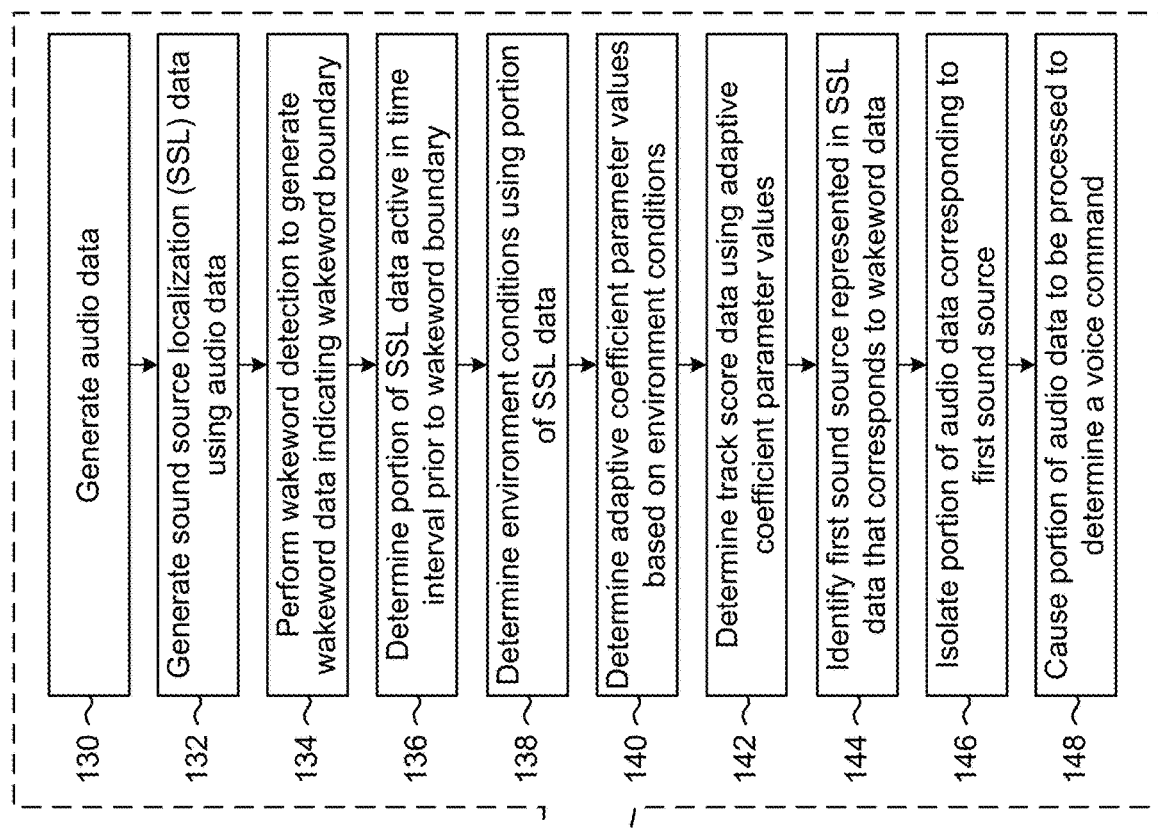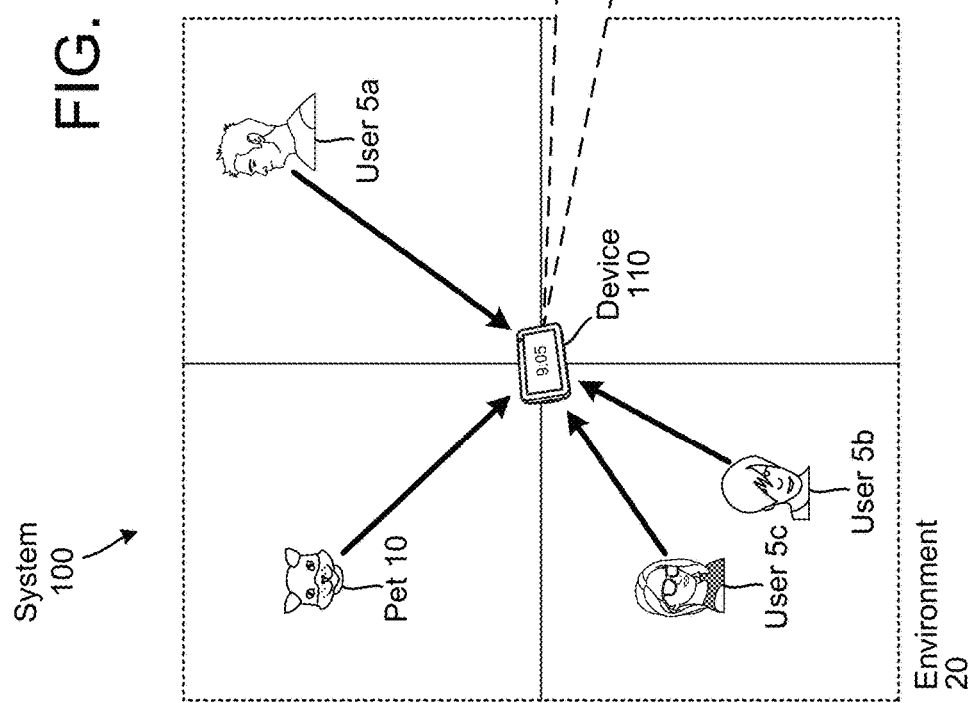

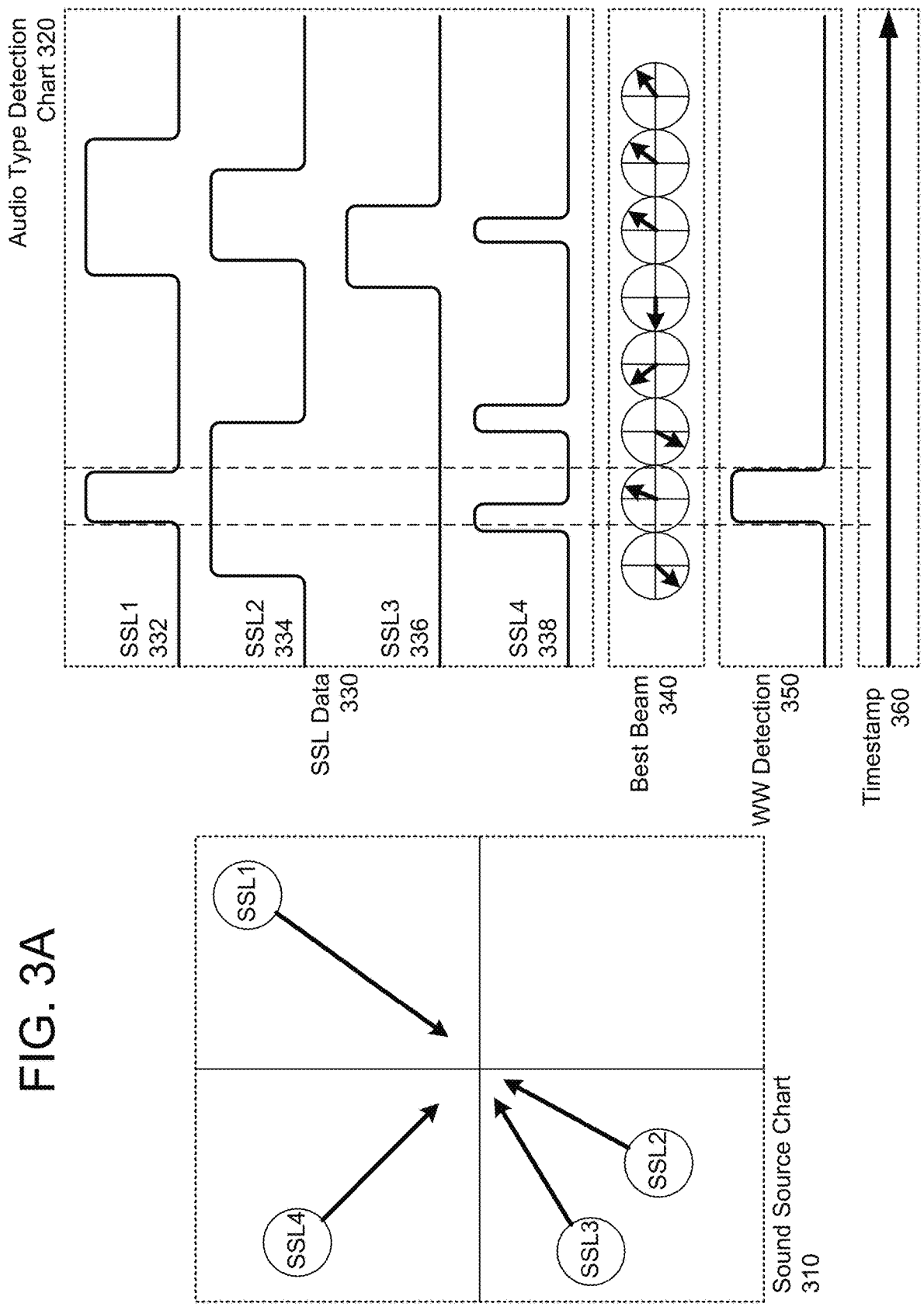

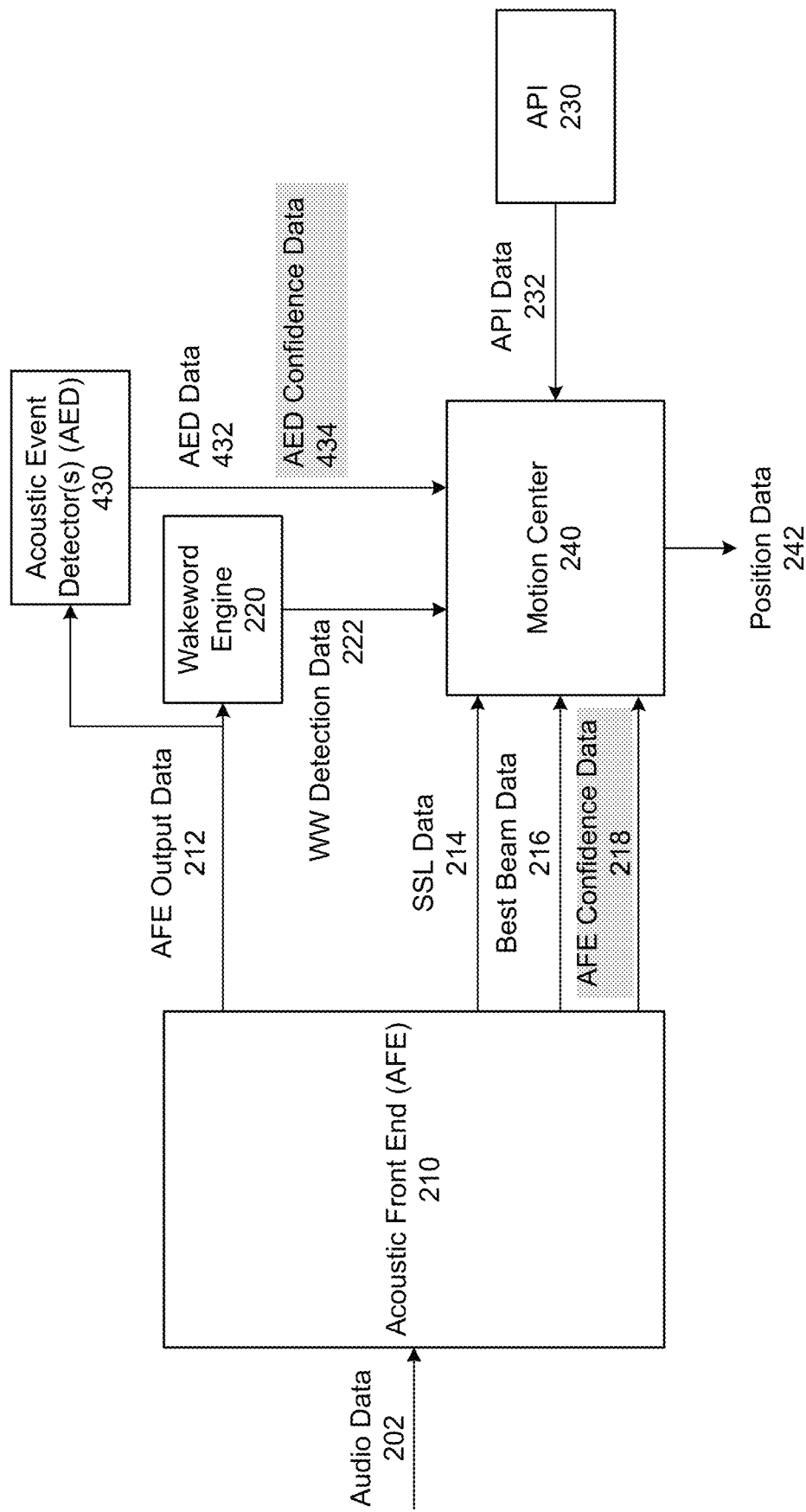

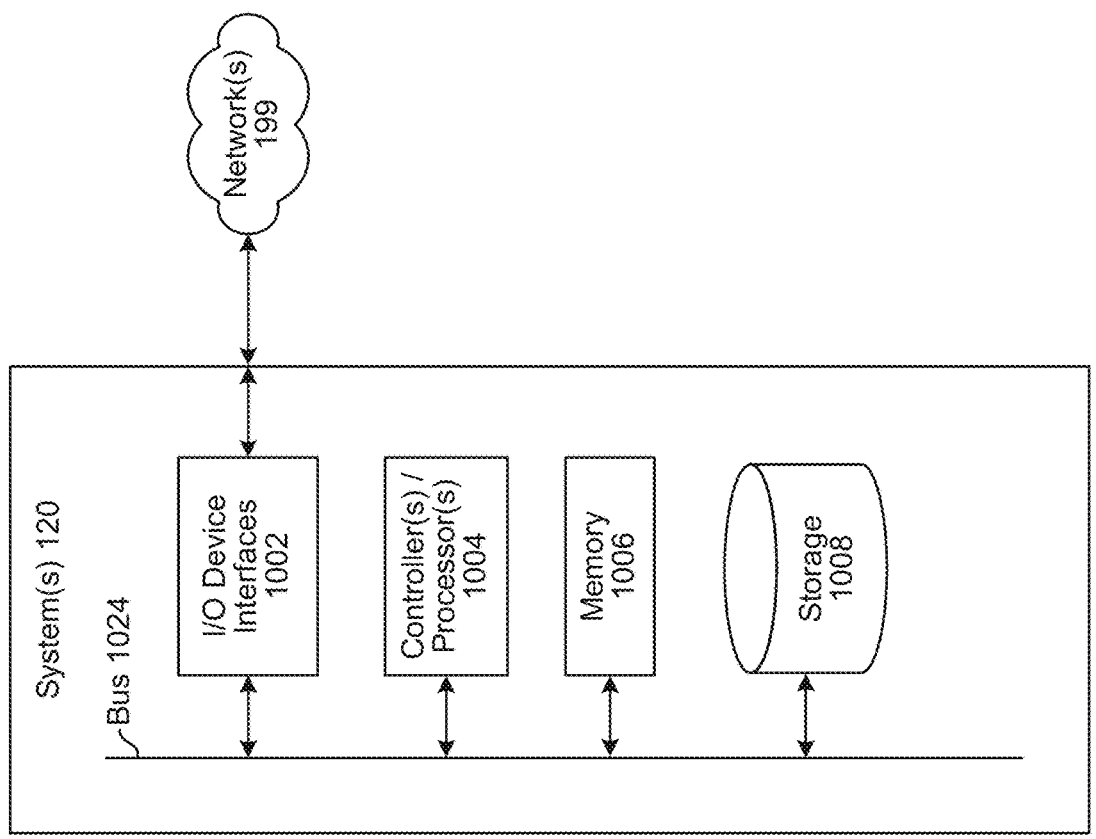

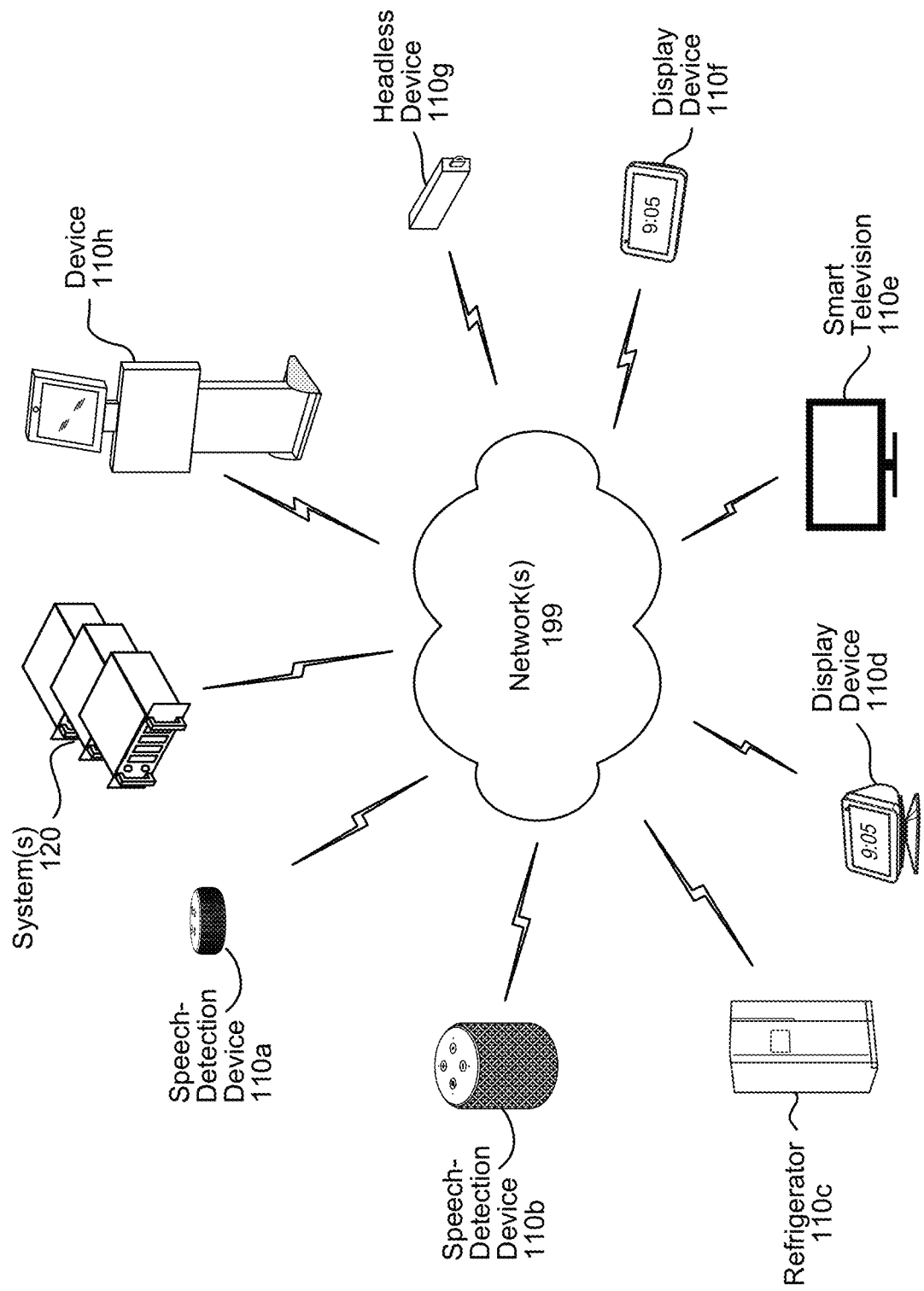

SOUND SOURCE LOCALIZATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system configured to perform sound track selection according to embodiments of the present disclosure.

FIGS. 3A-3B illustrate an example of performing sound source localization audio type detection according to examples of the present disclosure.

FIGS. 4A-4B illustrate example component diagrams of an audio type detection system using acoustic event detectors according to examples of the present disclosure.

FIG. 10 is a block diagram conceptually illustrating example components of a remote system according to embodiments of the present disclosure.

FIG. 11 illustrates an example of a computer network for use with a speech processing system.

DETAILED DESCRIPTION

Figure 2A:
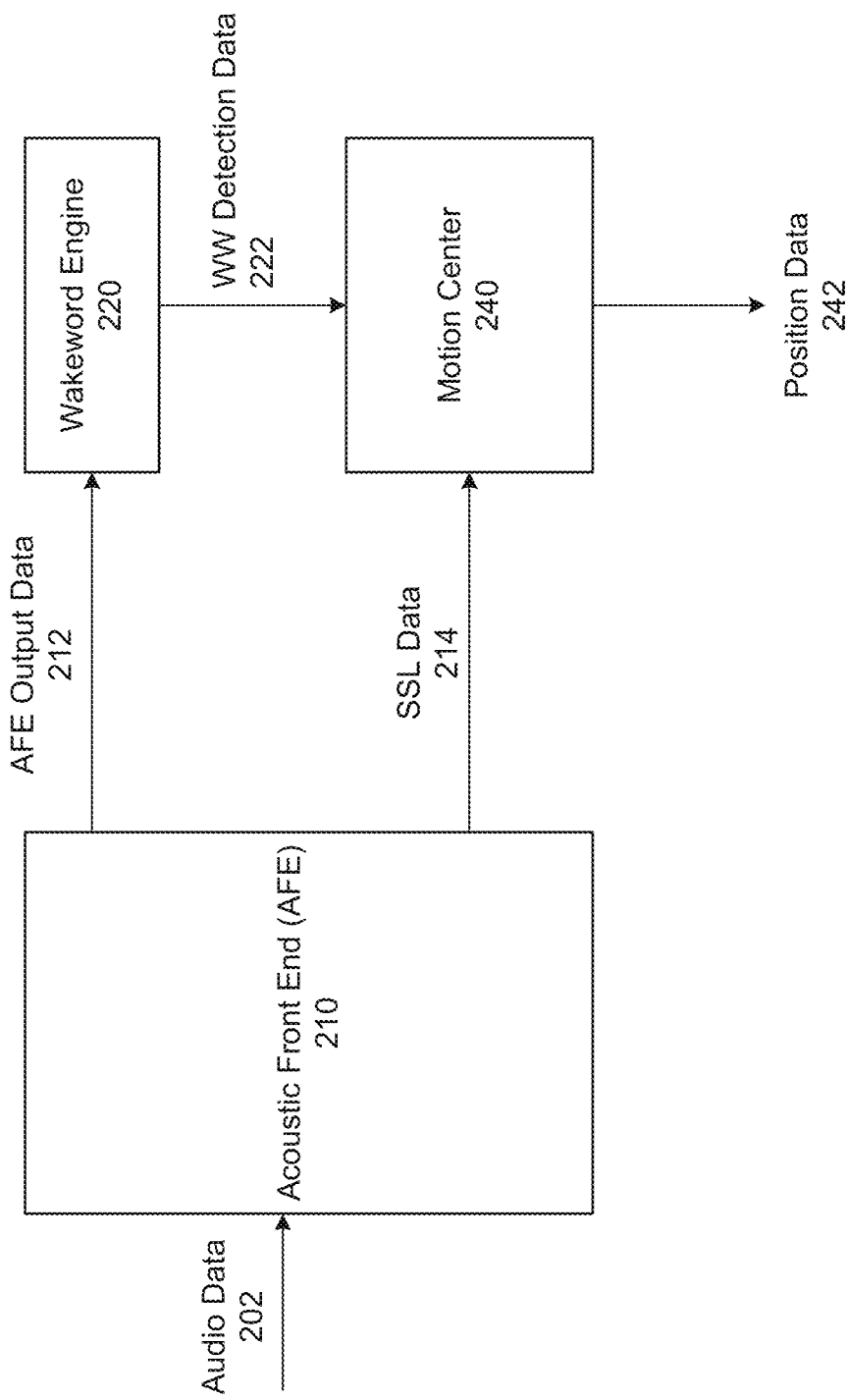
FIGS. 2A-2C illustrate example component diagrams of an audio type detection system according to examples of the present disclosure.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization to distinguish between multiple sound sources represented in the audio data. However, while the sound source localization separates the audio data based on the sound source, the device cannot tell which sound source is associated with the desired speech.

To improve sound source localization (SSL), devices, systems and methods are disclosed that perform SSL track selection by dynamically adjusting coefficient parameters based on current conditions. For example, the system may perform sound source localization (SSL) processing on input audio data to generate SSL data indicating multiple sound sources represented in the input audio data. The system may detect an acoustic event and perform SSL track selection to select the sound source that corresponds to the acoustic event based on input features, such as a power level, a confidence score, a correlation score, and/or the like. To improve SSL track selection, the system may detect current conditions of the environment and determine adaptive weight values that vary based on the current conditions. For example, the system may detect SSL tracks active during a time interval prior to the acoustic event and may use these SSL tracks to determine current conditions, such as a noise level of the environment, whether playback is detected, whether the device is located near one or more walls, etc. By adjusting the adaptive weight values, the system improves an accuracy of the SSL track selection by prioritizing the input features that are most predictive during the current conditions.

FIG. 1 illustrates a high-level conceptual block diagram of a system 100 configured to perform sound track selection according to embodiments of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and server(s) 120 that may be communicatively coupled to network(s) 199.

The device 110 may be an electronic device configured to capture and/or receive audio data. For example, the device 110 may include a microphone array configured to generate audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

As illustrated in FIG. 1, an environment 20 of the device 110 may include four separate sound sources, although the disclosure is not limited thereto. For example, FIG. 1 illustrates that the environment 20 may include a first user 5a at a first location (e.g., first direction relative to the device 110), a second user 5b at a second location (e.g., second direction relative to the device 110), a third user 5c at a third location (e.g., third direction relative to the device 110), and a pet 10 at a fourth location (e.g., fourth direction relative to the device 110). At various times, each of the sound sources may generate audible noises that may be represented in the input audio data generated by the device 110.

To perform sound source localization audio type detection, the device 110 may generate (130) audio data using a microphone array and may generate (132) sound source localization (SSL) data using the audio data. To illustrate an example, the device 110 may be configured to perform SSL processing on the audio data to generate SSL data corresponding to multiple sound sources. For example, the device 110 may determine that a first sound source is associated with a first location (e.g., first direction relative to the device 110) and the SSL data may indicate when an audible sound corresponding to the first location is represented in the input audio data. Thus, the SSL data may distinguish between multiple sound sources based on Time of Arrival (TOA)

processing, Delay of Arrival (DOA) processing, and/or the like, enabling the device 110 to track the sound sources over time.

The device 110 may perform (134) wakeword detection on the audio data to generate wakeword data indicating a wakeword boundary. For example, the device 110 may include a wakeword detector configured to generate the wakeword data, which includes a wakeword boundary indicating when a wakeword is represented in the audio data. As described in greater detail below with regard to FIGS. 4A-4B, the disclosure is not limited thereto and the device 110 may perform acoustic event detection without departing from the disclosure.

The device 110 may determine (136) a portion of the SSL data that is active in a time interval prior to the wakeword boundary. For example, the device 110 may determine individual SSL tracks that are active within a long-term noise window and/or a short-term noise window prior to the wakeword boundary. In some examples, the long-term noise window may correspond to a first time (e.g., 10 seconds) and the short-term noise window may correspond to a second time (e.g., 1 second), although the disclosure is not limited thereto.

The device 110 may determine (138) environment conditions using the portion of the SSL data. To illustrate a first example, the device 110 may determine a noise level of the environment (e.g., whether the environment is noisy) based on the number of unique SSL tracks active in the time interval prior to the wakeword boundary. For example, the device 110 may detect a noisy environment when the number of unique SSL tracks exceeds a first threshold value (e.g., value of 4, although the disclosure is not limited thereto), whereas the device 110 may detect a quiet environment when the number of unique SSL tracks is below the first threshold value. However, the disclosure is not limited thereto, and the device 110 may detect noisy conditions using other techniques without departing from the disclosure. For example, the device 110 may detect a noisy environment when a power value associated with the portion of the SSL data (e.g., average power value, maximum power value, and/or the like) exceeds a threshold value without departing from the disclosure.

To illustrate a second example, the device 110 may determine whether the device 110 is in proximity to one or more walls (e.g., near a wall, in a corner, etc.) based on a number of reflection tracks included in the portion of the SSL data that is active in the time interval prior to the wakeword boundary. For example, the device 110 may determine that the device 110 is in proximity to one or more walls (e.g., wall/corner classification) or other acoustically reflective surfaces when a percentage of SSL tracks that correspond to reflections exceeds a second threshold value (e.g., 50%, although the disclosure is not limited thereto), whereas the device 110 may determine that the device 110 is not in proximity to a wall (e.g., center classification) when the percentage of SSL tracks that correspond to reflections is below the second threshold value. However, the disclosure is not limited thereto, and the device 110 may detect a position of the device 110 relative to acoustically reflective surfaces using other techniques without departing from the disclosure.

To illustrate a third example, the device 110 may determine whether playback conditions are present based on a number of SSL tracks included in the portion of the SSL data that correspond to an echo signal. For example, the device 110 may detect playback conditions when one or more SSL tracks correspond to a loudspeaker or other sound source that generates playback audio. However, the disclosure is not limited thereto, and the device 110 may detect playback conditions using other techniques without departing from the disclosure. For example, the device 110 may detect playback conditions whenever the device 110 is sending playback audio data to a loudspeaker, without regard to the SSL data, without departing from the disclosure.

The device 110 may determine (140) adaptive coefficient parameter values based on the environment conditions and may determine (142) track score data using the adaptive coefficient parameter values. The adaptive coefficient parameter values may correspond to weight values associated with input feature data, enabling the device 110 to determine the track score data by calculating a weighted sum of the input feature data. For example, if the device 110 calculates the track score data using a first number of input features (e.g., 3, although the disclosure is not limited thereto), the adaptive coefficient parameters may include the first number of weight values.

The input feature data may include power values (e.g., total power, average power, maximum value, and/or the like associated with an individual SSL track), confidence values (e.g., likelihood that each of the SSL tracks corresponds to the wakeword event), correlation values (e.g., similarity between each of the SSL tracks and the wakeword data during the wakeword event), SSL type data (e.g., indicating a type of acoustic event associated with each of the SSL tracks), and/or the like without departing from the disclosure.

To illustrate an example, the input feature data may include a first track power value indicating an amount of power associated with the first SSL track (SSL1), a first confidence value indicating a first likelihood that the first SSL track (SSL1) corresponds to the wakeword event, and a first correlation value indicating a similarity between the first SSL track (SSL1) and the wakeword data representing the wakeword event. However, the disclosure is not limited thereto and the input feature data may include additional values without departing from the disclosure.

To determine the track score data, the device 110 may determine three adaptive coefficient parameter values corresponding to the input features; a first weight value corresponding to a first input feature (e.g., first track power value), a second weight value corresponding to a second input feature (e.g., first confidence value), and a third weight value corresponding to a third input feature (e.g., first correlation value).

The device 110 may determine the adaptive coefficient parameter values in response to the current environment conditions. For example, the device 110 may determine first weight values during first environment conditions (e.g., noisy environment, device 110 positioned near a wall or corner, etc.), may determine second weight values during second environment conditions (e.g., quiet environment, device 110 positioned away from a wall, etc.), and so on.

In some examples, during noisy conditions the device 110 may select a relatively low value (e.g., 0.3) for the first weight value corresponding to the first input feature (e.g., first track power value) and select a relatively high value (e.g., 1.2) for the third weight value corresponding to the third input feature (e.g., first correlation value). In contrast, during quiet conditions the device 110 may select a relatively high value (e.g., 1.4) for the second weight value corresponding to the second input feature (e.g., first confidence value), although the disclosure is not limited thereto.

Additionally or alternatively, when current environment conditions indicate that the device 110 is in proximity to a wall (e.g., wall/corner classification), the device 110 may select a relatively low value (e.g., 0.3) for the third weight value corresponding to the third input feature (e.g., first correlation value). For example, the device 110 may reduce the third weight value used to select the best SSL track because the cross-correlation value between a first SSL track that corresponds to a sound source and a second SSL track that corresponds to a reflection of the sound source may be almost identical. In contrast, when current environment conditions indicate that the device 110 is not in proximity to a wall (e.g., center classification), the device 110 may select a value of one for the third weight value corresponding to the third input feature (e.g., first correlation value).

In some examples, the adaptive coefficient parameters are normalized values (e.g., values between 0.0 and 1.0), with a minimum value (e.g., 0.0) removing the corresponding input feature from the weighted sum and a maximum value (e.g., 1.0) passing the corresponding input feature without attenuation or adjustment. However, the disclosure is not limited thereto, and in other examples the adaptive coefficient parameters may have a maximum value above one (e.g., 1.3, although the disclosure is not limited thereto), such that the adaptive coefficient parameter may increase a weight of the corresponding input feature relative to the other input features.

In some examples, the device 110 may calculate a first track score value for the first SSL track (SSL1) by taking a first weighted sum of the first input features (e.g., first track power value, first confidence value, and first correlation value) and the adaptive coefficient parameter values (e.g., first weight value, second weight value, and third weight value), although the disclosure is not limited thereto. Similarly, the device 110 may calculate a second track score value for the second SSL track (SSL2) by taking a second weighted sum of second input features (e.g., second track power value, second confidence value, and second correlation value) and the adaptive coefficient parameter values (e.g., first weight value, second weight value, and third weight value). Thus, while the device 110 may vary the adaptive coefficient parameter values depending on the environment conditions, the same weight values are used to calculate each of the track score values included in the track score data.

As described above, the track score data may include a unique track score value for each SSL track. For example, the device 110 may calculate the first track score value using the first input features and the adaptive coefficient parameter values, the second track score value using the second input features and the adaptive coefficient parameter values, and so on. In some examples, the first track score value may indicate a second likelihood that the first SSL track (SSL1) corresponds to the wakeword event. Thus, the device 110 may include the first confidence value (e.g., first confidence score) as one of the input features used to generate a second confidence value corresponding to the first SSL track. However, the disclosure is not limited thereto, and the first track score value may not indicate a likelihood that the first SSL track (SSL1) corresponds to the wakeword event without departing from the disclosure. For example, the first track score value may correspond to a first value (e.g., 1.3) and the second track score value may correspond to a second value (e.g., 0.8) without departing from the disclosure.

The device 110 may identify (144) a first sound source represented in the SSL data that corresponds to the wakeword data. For example, the device 110 may compare the track score values and select a highest track score value represented in the track score data. Thus, the device 110 may identify the first sound source corresponding to the highest track score value. To illustrate an example, the device 110 may compare the first track score value to the second track score value, may determine that the first track score value exceeds the second track score value, and may associate the first SSL track with the wakeword event. Thus, the device 110 may determine which sound source corresponds to the wakeword data the most, indicating that the selected sound source generated the wakeword represented in the audio data.

In some examples, the device 110 may synchronize the SSL data and the wakeword data using embedded timestamp data. As described in greater detail below with regard to FIGS. 2A-2C, the device 110 may generate a global timestamp (e.g., timestamp data) and may use this timestamp data to synchronize the SSL data, the wakeword data, and/or other data generated by the device 110. For example, the device 110 may embed the timestamp data in the SSL data, single channel audio data, and/or the wakeword data, enabling an individual component to access the timestamp data even if the individual component has an internal clock, generates second timestamp data, and/or the like. This enables multiple components of the device 110 to maintain a consistent global reference so that the various inputs are aligned prior to determining the correlation data.

By determining track score values indicating how much each SSL track (e.g., sound source) corresponds to the wakeword data, the system may identify a sound source that is most likely to have generated the wakeword and may associate this sound source with the wakeword. Thus, the system may identify the sound source associated with desired speech and may use the SSL data to track this sound source over time. For example, the device 110 may isolate (146) a portion of the audio data corresponding to the first sound source and may cause (148) the portion of the audio data to be processed to determine a voice command.

In some examples, the device 110 may be configured to perform natural language processing to determine the voice command and may perform an action corresponding to the voice command. However, the disclosure is not limited thereto and in other examples the device 110 may be configured to send the portion of the audio data to a natural language processing system to determine the voice command without departing from the disclosure.

Figure 2B:
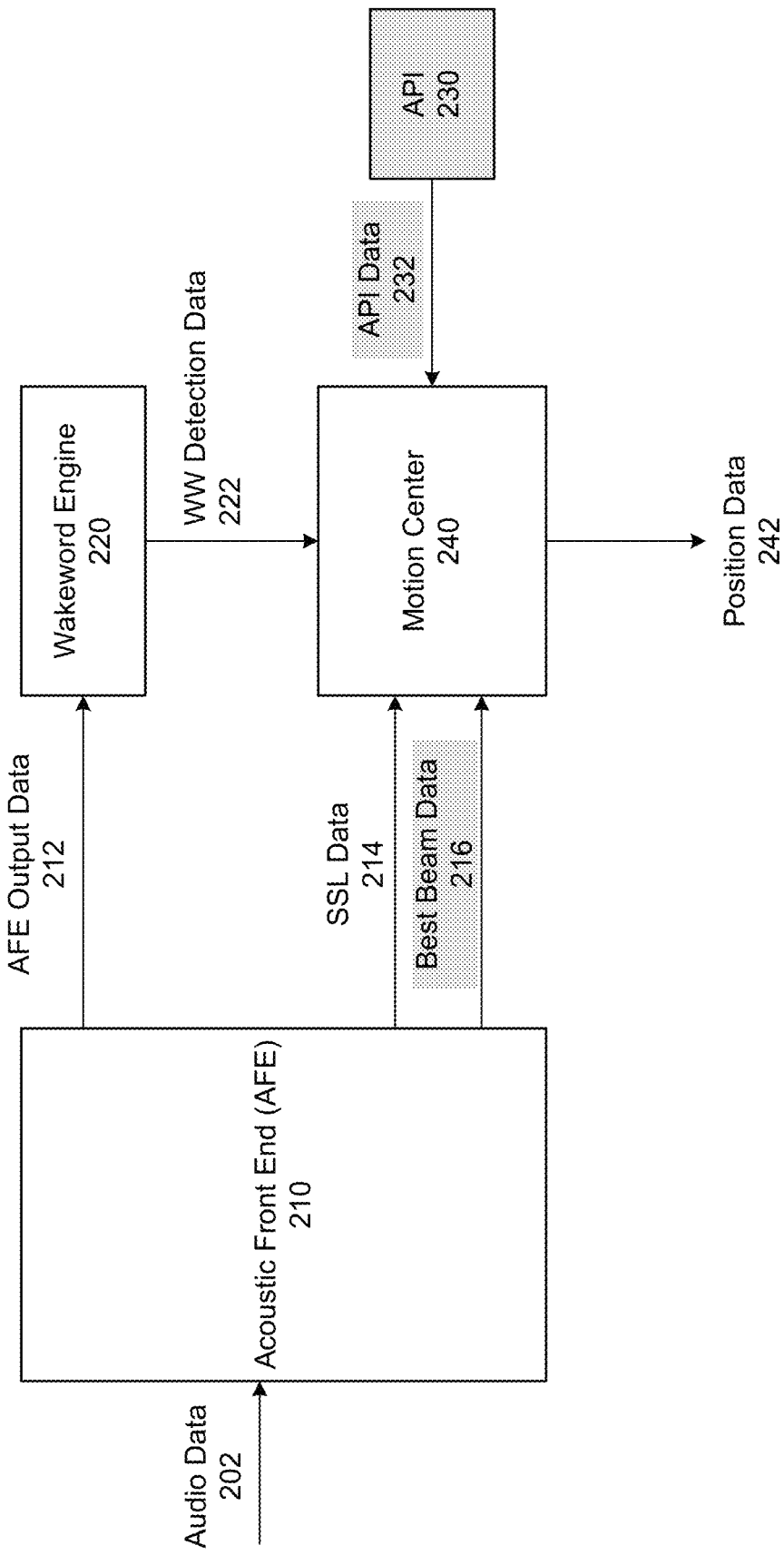
Figure 2C:
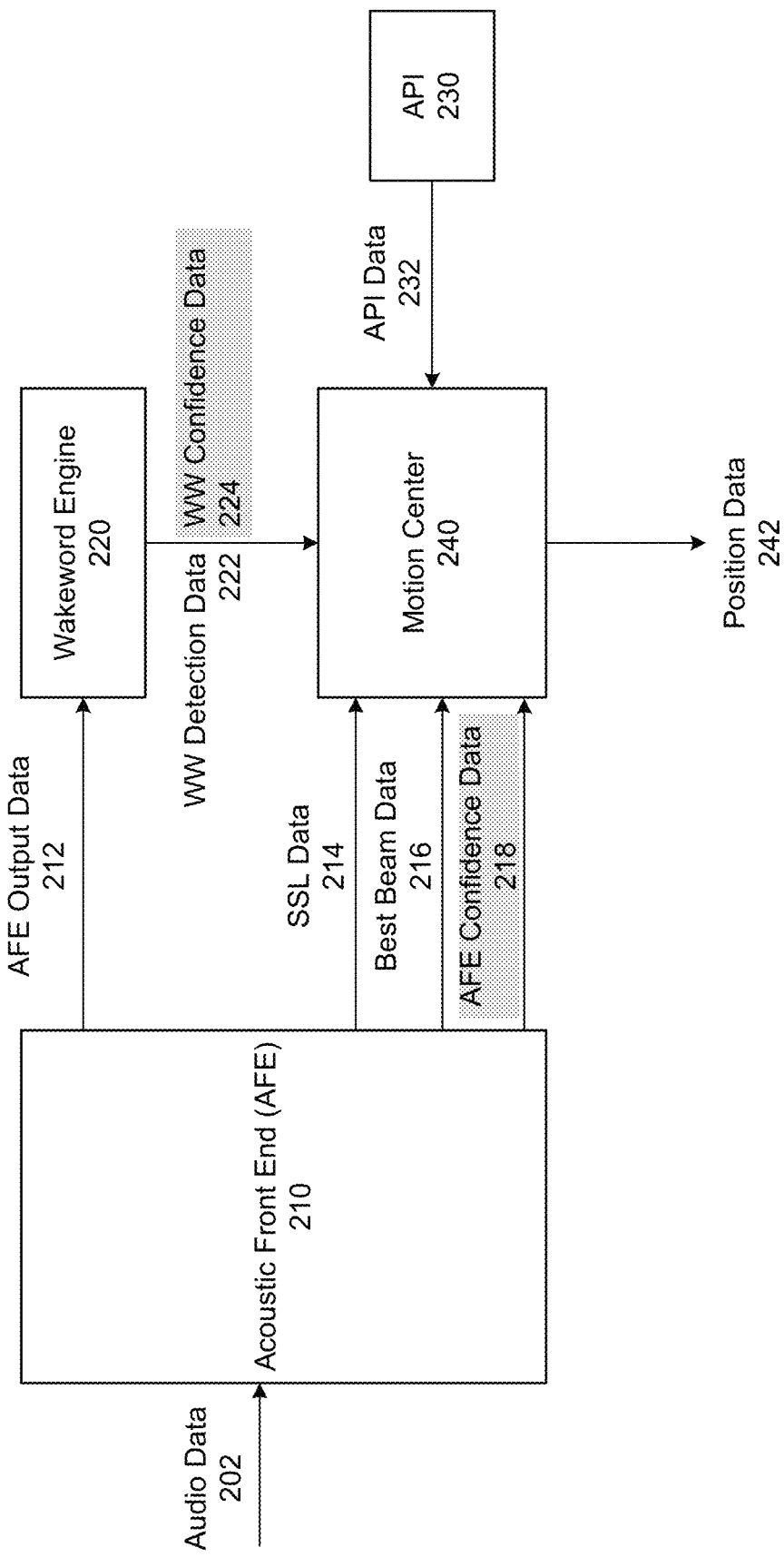

FIGS. 2A-2C illustrate example component diagrams of an audio type detection system according to examples of the present disclosure. As illustrated in FIG. 2A, the device 110 may perform audio type detection 200 using an acoustic front end (AFE) component 210 that is configured to generate multiple types of output data. For example, the AFE component 210 may receive audio data 202 and generate AFE output data 212, sound source localization (SSL) data 214, and/or additional output data such as best beam data 216, which will be described below with regard to FIG. 2B, and/or AFE confidence data 218, which will be described below with regard to FIG. 2C.

The audio data 202 may be generated by a microphone array of the device 110 and therefore may correspond to multiple channels. For example, if the microphone array includes eight individual microphones, the audio data 202 may include eight individual channels. To improve audio processing of subsequent components, such as a wakeword engine component 220, the AFE component 210 may process the multi-channel audio data 202 to generate a single channel output. For example, the AFE component 210 may process the audio data 202 to reduce noise and other signals in order to isolate a speech signal represented in the audio data 202. Thus, the AFE output data 212 may correspond to a single channel with a higher signal to noise ratio (SNR) than the audio data 202.

In addition to the AFE output data 212, the AFE component 210 may generate the SSL data 214. For example, the AFE component 210 may perform sound source localization processing to separate the audio data 202 based on sound source and indicate when an individual sound source is represented in the audio data 202. To illustrate an example, the AFE component 210 may detect a first sound source (e.g., first portion of the audio data corresponding to a first direction relative to the device 110) during a first time range, a second sound source (e.g., second portion of the audio data corresponding to a second direction relative to the device 110) during a second time range, and so on. Thus, the SSL data 214 may include a first portion or first SSL data indicating when the first sound source is detected, a second portion or second SSL data indicating when the second sound source is detected, and so on. The AFE component 210 may use Time of Arrival (TOA) processing, Delay of Arrival (DOA) processing, and/or the like to determine the SSL data 214, although the disclosure is not limited thereto. In some examples, the SSL data 214 may include multiple SSL tracks (e.g., individual SSL track for each unique sound source represented in the audio data 202), along with additional information for each of the individual SSL tracks. For example, for a first SSL track corresponding to a first sound source (e.g., audio source), the SSL data 214 may indicate a position and/or direction associated with the first sound source location, a signal quality metric (e.g., power value) associated with the first SSL track, and/or the like, although the disclosure is not limited thereto.

As illustrated in FIG. 2A, the AFE component 210 may output the AFE output data 212 to a wakeword engine 220. For example, the wakeword engine 220 may be configured to process the AFE output data 212 (e.g., single channel audio data) to determine whether a wakeword is detected in the AFE output data 212. However, the wakeword engine 220 is only intended to conceptually illustrate an example and the disclosure is not limited thereto. Instead, the AFE component 210 may send the AFE output data 212 to a different component (e.g., an acoustic event detector), to multiple components (e.g., the wakeword engine 220 and/or one or more acoustic event detectors), and/or the like without departing from the disclosure.

In the example illustrated in FIG. 2A, the AFE component 210 may send the AFE output data 212 to the wakeword engine 220 and the wakeword engine 220 may generate wakeword (WW) detection data 222 indicating when a wakeword is detected in the AFE output data 212 (and therefore represented in the audio data 202). As will be described in greater detail below with regard to FIG. 4, the WW detection data 222 may indicate a start time and an end time for each wakeword detected in the AFE output data 212. Thus, a motion center component 240 may receive the WW detection data 222 and associate an individual wakeword with a sound source based on the SSL data 214.

As represented by the audio type detection 200 illustrated in FIG. 2A, the motion center component 240 may receive the SSL data 214 from the AFE component 210 and the WW detection data 222 from the wakeword engine 220. While not illustrated in FIG. 2A, the AFE component 210 may generate timestamp data corresponding to a series of timestamps using a global clock signal. The AFE component 210 may expose the timestamp data to the other components (e.g., the wakeword engine 220, the motion center component 240, and/or additional components) and the device 110 may synchronize the data generated by each of these components using the timestamp data. For example, the device 110 may associate a portion of the SSL data 214 that corresponds to a first timestamp with a portion of the WW detection data 222 that corresponds to the first timestamp. Thus, the device 110 may align a timeline between each of the components using the timestamp data generated by the AFE component 210.

While the device 110 may align the timeline between each of the components (e.g., synchronize data generated by each of these components using the global clock signal), the components may exhibit different and/or varying propagation delays and other processing delays. As a result, the information represented in the SSL data 214, and/or the WW detection data 222 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 may not align perfectly with audible sounds represented in the SSL data 214.

The motion center 240 is configured to process the SSL data 214 and the WW detection data 222 to generate position data 242 corresponding to the sound sources. For example, the motion center 240 may be configured to track a sound source over time, collecting information about the sound source and maintaining a position of the sound source relative to the device 110. Thus, the motion center 240 may enable the device 110 to track the sound source even as the device 110 and/or the sound source move relative to each other. In some examples, the position data 242 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

As will be described in greater detail below, the motion center 240 may use the SSL data 214 and the WW detection data 222 to perform sound source localization audio type detection. For example, the motion center 240 may determine a correlation between the WW detection data 222 a portion of the SSL data 214 corresponding to a sound source in order to identify the sound source associated with the wakeword.

While FIG. 2A illustrates a simple example of the audio type detection 200, the disclosure is not limited thereto. For example, FIG. 2B illustrates an example of audio type detection 250 that includes the best beam data 216 generated by the AFE component 210. While the SSL data 214 may include separate SSL data for each individual sound source represented in the audio data 202, the best beam data 216 only corresponds to a single "beam" at a time, indicating a direction that corresponds to a strongest signal for a particular time range. For example, the AFE component 210 may generate the best beam data 216 by identifying a strongest signal quality metric (e.g., signal-to-noise ratio (SNR) value, energy value, etc.) of sound sources represented in the audio data 202 and determining a direction associated with the strongest signal quality metric. While the AFE component 210 only selects a single beam at a time, the best beam selected by the AFE component 210 may vary over time without departing from the disclosure, indicating which sound source is strongest at a given time.

In addition to optionally generating the best beam data 216, in some examples the device 110 may include an application programming interface (API) component 230 that may be configured to generate API data 232, as illustrated in FIG. 2B. To illustrate an example, the API component 230 may correspond to computer vision and the API data 232 may include additional information about the sound source(s) that is generated by processing image data. For example, the API component 230 may perform object recognition to identify a type of object represented in image data, may perform human detection to determine that a human is represented in the image data and/or a location of the human, may perform facial recognition to determine an identity of the human represented in the image data, and/or the like without departing from the disclosure. However, the disclosure is not limited thereto and the API data 232 may vary without departing from the disclosure.

As represented by the audio type detection 250 illustrated in FIG. 2B, the motion center component 240 may receive the SSL data 214 and the best beam data 216 from the AFE component 210, the WW detection data 222 from the wakeword engine 220, and/or the API data 232 from the API component 230. While FIG. 2B illustrates a single API component 230, the disclosure is not limited thereto and the motion center 240 may receive API data 232 from multiple API components 230 without departing from the disclosure.

As discussed above with regard to FIG. 2A, the AFE component 210 may generate timestamp data corresponding to a series of timestamps using a global clock signal. Thus, the AFE component 210 may embed the timestamp data in the best beam data 216 and/or expose the timestamp data to the API component 230 to enable the device 110 to synchronize multiple components using the timestamp data. While the device 110 may align the timeline between each of the components (e.g., synchronize data generated by each of these components using the global clock signal), the components may exhibit different and/or varying propagation delays and other processing delays. As a result, the information represented in the SSL data 214, the best beam data 216, the WW detection data 222, and/or the API data 232 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 may not align perfectly with audible sounds represented in the SSL data 214.

In the audio type detection 250 example illustrated in FIG. 2B, the motion center 240 is configured to process the SSL data 214, the best beam data 216, the WW detection data 222, and/or the API data 232 to generate the position data 242 corresponding to the sound sources. Thus, the motion center 240 may be configured to track a sound source over time as described above with regard to FIG. 2A.

In some examples, the device 110 may determine confidence score data corresponding to the SSL data 214 and/or the WW detection data 222. For example, FIG. 2C illustrates an example of the device 110 performing audio type detection 260 in which the AFE component 210 may generate AFE confidence data 218 corresponding to the SSL data 214 and/or the wakeword engine 220 may generate WW confidence data 224 corresponding to the WW detection data 222.

While FIG. 2C illustrates an example of the device 110 generating both the AFE confidence data 218 and the WW confidence data 224, the disclosure is not limited thereto and the device 110 may generate the AFE confidence data 218 or the WW confidence data 224 without departing from the disclosure. Additionally or alternatively, while FIG. 2C illustrates an example of the device 110 generating the AFE confidence data 218 and the WW confidence data 224 in addition to the best beam data 216 and/or the API data 232, the disclosure is not limited thereto and the device 110 may generate any combination of the best beam data 216, the AFE confidence data 218, the WW confidence data 224, and/or the API data 232 without departing from the disclosure.

As illustrated in FIG. 2C, the AFE component 210 may generate AFE confidence data 218 and send the AFE confidence data 218 to the motion center 240. The AFE confidence data 218 may indicate a likelihood that an individual SSL track (e.g., separate SSL data for each individual sound source represented in the audio data 202) corresponds to a particular noise or sound (e.g., wakeword event, speech, acoustic event, etc.).

In some examples, the AFE confidence data 218 may indicate a likelihood that each individual SSL track corresponds to a particular noise or acoustic event. To illustrate a simple example, each of the SSL tracks may have a unique AFE confidence score indicating a probability that the SSL track corresponds to a single acoustic event, such as speech. Thus, if the SSL data 214 identifies four unique sound sources, the AFE confidence data 218 may include four confidence values indicating a likelihood that each of the four unique sound sources corresponds to speech. However, the disclosure is not limited thereto and the AFE confidence score may generate confidence values for multiple acoustic events without departing from the disclosure. In some examples, the AFE confidence data 218 may include confidence values for each individual SSL track and for each acoustic event being tracked (e.g., wakeword event, speech, pet noises, mechanical noises, etc.). For example, if the device 110 is tracking speech and one acoustic event (e.g., pet noises), each of the SSL tracks may be associated with two unique AFE confidence scores; a first AFE confidence score indicating a first probability that the SSL track corresponds to a first acoustic event (e.g., speech) and a second AFE confidence score indicating a second probability that the SSL track corresponds to a second acoustic event (e.g., animal noises, pet noises, and/or the like). Thus, if the SSL data 214 identifies four unique sound sources, the AFE confidence data 218 may include eight confidence values indicating a likelihood that each of the four unique sound sources corresponds to the first acoustic event or the second acoustic event.

The disclosure is not limited thereto, however, and in some examples the AFE confidence data 218 may only include a single confidence score for each of the unique sound sources without departing from the disclosure. For example, if the AFE component 210 is configured to detect multiple acoustic events, the AFE confidence data 218 may indicate a highest confidence score and corresponding acoustic event that is associated with each of the unique sound sources. To illustrate an example, the AFE component 210 may be configured to detect four separate types of acoustic events; a wakeword, speech, pet noises, and mechanical noises. Thus, if the SSL data 214 identifies four unique sound sources, the AFE confidence data 218 may include four confidence values, with a first confidence value indicating a likelihood that a first sound source corresponds to a first acoustic event (e.g., wakeword event), a second confidence value indicating a likelihood that a second sound source corresponds to a second acoustic event (e.g., speech), a third confidence value indicating a likelihood that a third sound source corresponds to the second acoustic event (e.g., speech), and a fourth confidence value indicating a likelihood that a fourth sound source corresponds to a third acoustic event (e.g., pet noises). Thus, instead of including sixteen separate confidence values (e.g., likelihood that a single sound source corresponds to each of the four types of acoustic events), the AFE confidence data 218 may only include four confidence values identifying the most likely type of acoustic event for each of the sound sources without departing from the disclosure.

As illustrated in FIG. 2C, in some examples the wakeword engine 220 may generate wakeword (WW) confidence data 224 and send the WW confidence data 224 to the motion center 240. The WW confidence data 224 may indicate a likelihood that a wakeword is represented in the AFE output data 212. In some examples, the WW confidence data 224 may include an individual confidence score for each wakeword event (e.g., period of time in which the wakeword engine 220 indicates that a single wakeword is represented in the AFE output data 212). For example, the wakeword engine 220 may distinguish between a first wakeword event having a first confidence score (e.g., first likelihood that a wakeword is represented in a first portion of the audio data 202) and a second wakeword event having a second confidence score (e.g., second likelihood that a wakeword is represented in a second portion of the audio data 202). However, the disclosure is not limited thereto, and the WW confidence data 224 may include a plurality of confidence scores without departing from the disclosure. For example, the wakeword engine 220 may generate WW confidence data 224 that includes periodic confidence scores, such as an individual confidence score for each individual audio frame, for a predetermined period of time, and/or the like without departing from the disclosure.

As represented by the audio type detection 260 illustrated in FIG. 2C, the motion center component 240 may receive the SSL data 214, the best beam data 216, and/or the AFE confidence data 218 from the AFE component 210, the WW detection data 222 and/or the WW confidence data 224 from the wakeword engine 220, and/or the API data 232 from the API component 230. While FIG. 2C illustrates a single API component 230, the disclosure is not limited thereto and the motion center 240 may receive API data 232 from multiple API components 230 without departing from the disclosure.

As discussed above with regard to FIG. 2A, the AFE component 210 may generate timestamp data corresponding to a series of timestamps using a global clock signal. Thus, the AFE component 210 may embed the timestamp data in the AFE output data 212 and the AFE confidence data 218 and/or expose the timestamp data to the wakeword engine 220 to enable the device 110 to synchronize multiple components using the timestamp data. While the device 110 may align the timeline between each of the components (e.g., synchronize data generated by each of these components using the global clock signal), the components may exhibit different and/or varying propagation delays and other processing delays. As a result, the information represented in the SSL data 214, the best beam data 216, the AFE confidence data 218, the WW detection data 222, the WW confidence data 224, and/or the API data 232 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 may not align perfectly with audible sounds represented in the SSL data 214.

In the audio type detection 260 example illustrated in FIG. 2C, the motion center 240 is configured to process the SSL data 214, the best beam data 216, the AFE confidence data 218, the WW detection data 222, the WW confidence data 224, and/or the API data 232 to generate the position data 242 corresponding to the sound sources. Thus, the motion center 240 may be configured to track a sound source over time as described above with regard to FIG. 2A without departing from the disclosure. For example, the motion center 240 may enable the device 110 to track the sound source even as the device 110 and/or the sound source move relative to each other. In some examples, the position data 242 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

As described in greater detail below with regard to FIG. 3B, in some examples the motion center 240 may generate the position data 242 by calculating correlation data between each of the individual SSL tracks and the WW detection data 222. For example, the device 110 may calculate first correlation data that includes correlation values (e.g., ranging from 0.0 to 1.0) indicating a similarity between each of the individual SSL tracks and a first wakeword event represented in the WW detection data 222. The motion center 240 may then use the first correlation data to determine which of the individual SSL tracks corresponds to the first wakeword event. For example, if the first correlation data includes a first correlation value (e.g., 0.88) associated with a first sound source and a second correlation value (e.g., 0.33) associated with a second sound source, the motion center 240 may determine that the first correlation value is a highest correlation value included in the first correlation data and associate the first sound source with the first wakeword event.

In some examples, the motion center 240 may generate the position data 242 using both the SSL data 214 and the AFE confidence data 218 described above. For example, if the AFE confidence data 218 indicates a likelihood that an individual SSL track corresponds to a particular acoustic event (e.g., wakeword event, speech, etc.), the motion center 240 may generate the first correlation data described above and then generate second correlation data using a weighted sum of the first correlation data and the AFE confidence data 218, although the disclosure is not limited thereto. For example, if the first correlation data includes a first correlation value (e.g., 0.88) associated with a first sound source and a second correlation value (e.g., 0.33) associated with a second sound source, and the AFE confidence data 218 includes a first confidence value (e.g., 0.75) associated with the first sound source and a second confidence value (e.g., 0.5) associated with the second sound source, the motion center 240 may generate second correlation data including a first value (e.g., 0.88*0.75=0.66) corresponding to the first sound source and a second value (e.g., 0.33*0.5=0.167) corresponding to the second sound source. Thus, the motion center 240 may determine that the first value is a highest value included in the second correlation data and associate the first sound source with the first wakeword event. However, this example is intended to conceptually illustrate a simple example and the disclosure is not limited thereto.

In other examples, the motion center 240 may include a machine learning model, such as a deep neural network (DNN) or the like, without departing from the disclosure. For example, the motion center 240 may be configured to process the SSL data 214, the best beam data 216, the AFE confidence data 218, the WW detection data 222, the WW confidence data 224, the API data 232, and/or additional data using the machine learning model to generate the position data 242 corresponding to the sound sources.

To illustrate a simple example, the motion center 240 may generate the first correlation data using the SSL data 214 and the WW detection data 222, as described above, and may input the first correlation data and the AFE confidence data 218 to the machine learning model. Instead of generating the weighted sum described above, however, the machine learning model may generate output confidence data including confidence scores for each of the individual SSL tracks. In this example, the motion center 240 may determine that a first output confidence value corresponding to the first sound source is a highest output confidence value of the output confidence data and associate the first sound source with the first wakeword event. The disclosure is not limited thereto, however, and in other examples the machine learning model may generate output data without the motion center 240 calculating the first correlation data without departing from the disclosure.

To illustrate another example, the motion center 240 may input the SSL data 214, the best beam data 216, the AFE confidence data 218, the WW detection data 222, the WW confidence data 224, and/or the API data 232 to the machine learning model to generate the output data. The output data may correspond to correlation values (e.g., similarity between each of the SSL tracks and the WW detection data 222 during the wakeword event), confidence values (e.g., likelihood that each of the SSL tracks corresponds to the wakeword event), SSL type data (e.g., indicating a type of acoustic event associated with each of the SSL tracks), and/or the like without departing from the disclosure.

Figure 3B:
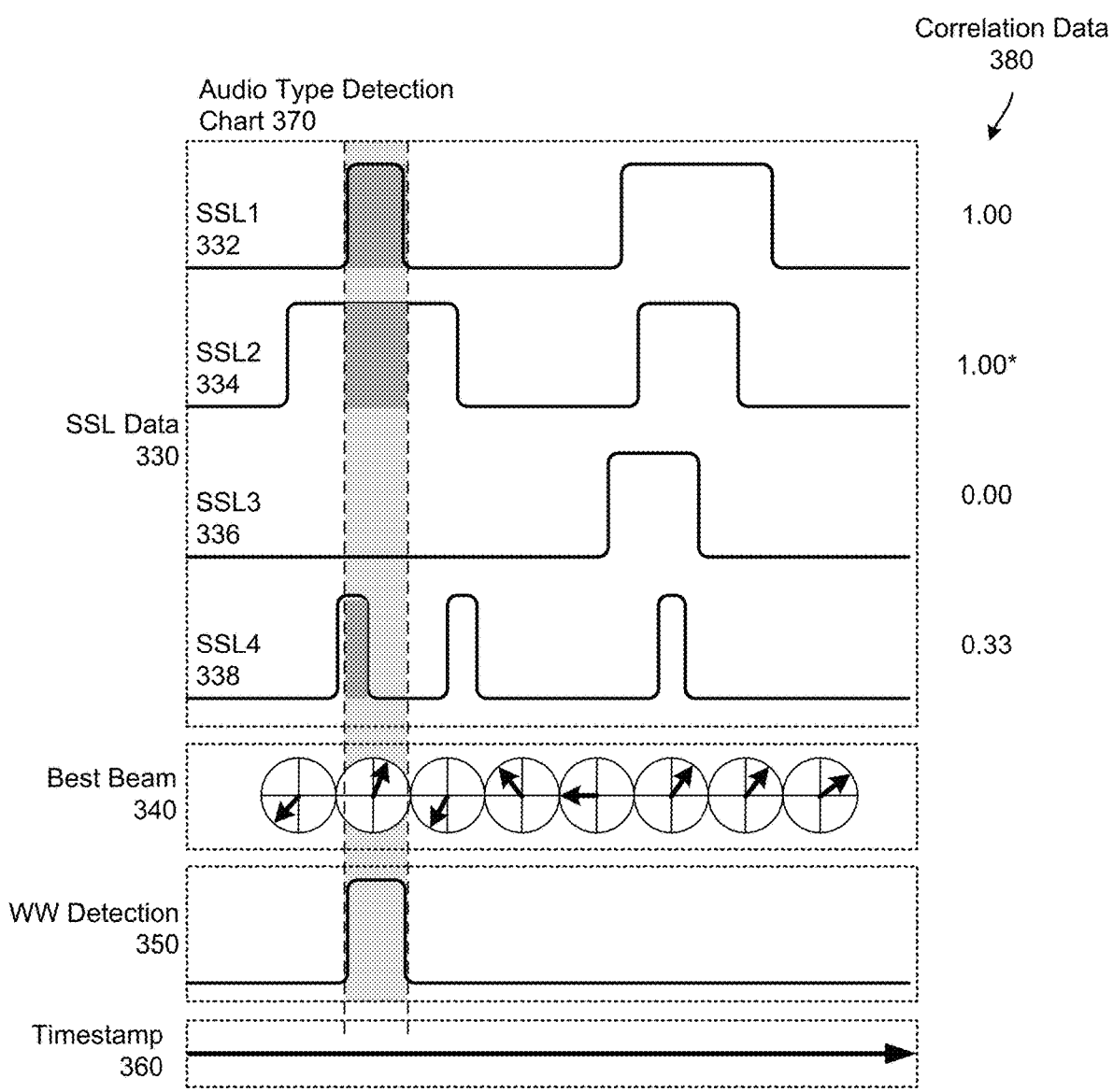

FIGS. 3A-3B illustrate an example of performing sound source localization audio type detection according to examples of the present disclosure. As illustrated in FIG. 3A, the environment 20 described above with regard to FIG. 1 is represented by sound source chart 310, which depicts four different sound source locations relative to the device 110. Thus, the device 110 may generate SSL data 330 that distinguishes between individual sound sources in the environment 20 and represents each of the sound sources based on a corresponding location. For example, the device 110 may identify a first sound source location (e.g., SSL1) corresponding to the first user 5a and generate first SSL data 332 (e.g., a first portion of the SSL data 330) corresponding to first speech generated by the first user 5a, identify a second sound source location (e.g., SSL2) corresponding to the second user 5b and generate second SSL data 334 (e.g., a second portion of the SSL data 330) corresponding to second speech generated by the second user 5b, identify a third sound source location (e.g., SSL3) corresponding to the third user 5c and generate third SSL data 336 (e.g., a third portion of the SSL data 330) corresponding to third speech generated by the third user 5c, and identify a fourth sound source location (e.g., SSL4) corresponding to the pet 10 and generate fourth SSL data 338 (e.g., a fourth portion of the SSL data 330) corresponding to audible noises (e.g., barking, growling, etc.) generated by the pet 10.

To illustrate a simple example of performing audio type detection, FIG. 3A includes audio type detection chart 320. As illustrated in FIG. 3A, the audio type detection chart 320 illustrates the SSL data 330 mentioned above along with best beam data 340 and WW detection data 350, which are aligned with each other using timestamp data 360 generated by the AFE component 210.

As illustrated in the audio type detection chart 320, a first binary value (e.g., 0) indicates that a signal is not represented in the audio data, while a second binary value (e.g., 1) indicates that the signal is represented in the audio data. Thus, the SSL1 data 332 may include a short pulse and a long pulse, which corresponds to the first user 5a speaking twice (e.g., for a short length of time during a first time range and then for a longer length of time during a second time range). Similarly, the SSL2 data 334 includes a long pulse and a medium pulse, which corresponds to the second user 5b speaking twice (e.g., for a longer length of time during the first time range and then for a medium length of time during the second time range). In contrast, the SSL3 data 336 only includes a single medium pulse, which corresponds to the third user 5c speaking once (e.g., for a medium length of time during the second time range). Finally, the SSL4 data 338 includes three short pulses, which corresponds to the pet 10 barking three times (e.g., twice during the first time range and once during the second time range).

As illustrated in the audio type detection chart 320, some of the sounds may overlap in time. For example, the first user 5a and the second user 5b speak at the same time during the first time range, while the pet 10 interrupts portions of this speech with barking. In addition, the first user 5a, the second user 5b, and the third user 5c speak at the same time during the second time range, which the pet 10 also interrupts with barking.

In the audio type detection illustrated in FIG. 3A, the device 110 may associate one of the sound sources with the wakeword represented in the WW detection data 350. For example, the device 110 may identify which sound source is present at the same time as the wakeword represented in the WW detection data 350 and associate this sound source with human speech and/or a voice command. Due to the overlapping signals, the propagation delays, and/or other processing delays mentioned above, however, the device 110 cannot easily identify which of the sound sources corresponds to the WW detection data 350.

To perform sound source localization audio type detection, the device 110 may determine a correlation between each of the sound sources and the WW detection data 350. For example, the device 110 may determine first correlation data corresponding to a first correlation between the SSL1 data 332 and the WW detection data 350, second correlation data corresponding to a second correlation between the SSL2 data 334 and the WW detection data 350, third correlation data corresponding to a third correlation between the SSL3 data 336 and the WW detection data 350, and fourth correlation data corresponding to a fourth correlation between the SSL4 data 338 and the WW detection data 350. After determining the correlation data, the device 110 may determine which of the sound sources is most similar to the WW detection data 350 (e.g., strongest correlation represented in the correlation data) and may associate the selected sound source with the wakeword.

In the example illustrated in FIG. 3A, the correlation data indicates a similarity between the WW detection data 350 and the SSL data 330 during a first time window in which the wakeword is detected, which corresponds to the pulse represented in the WW detection data 350. FIG. 3B illustrates audio type detection chart 370, which visually illustrates an example of how the device 110 may determine correlation data 380.

As illustrated in FIG. 3B, the first time window corresponding to the pulse represented in the WW detection data 350 is highlighted using shades of gray. For each individual portion of the SSL data 330 and each timestamp within the first time window, the device 110 may perform a mathematical operation to compare a first value of the portion of the SSL data 330 to a second value of the WW detection data 350 at the timestamp. For example, the device 110 may perform an "exclusive or" XOR (e.g., exclusive disjunction) operation between the first value of the SSL1 data 332 and the second value of the WW detection data 350, although the disclosure is not limited thereto and the device 110 may perform other operations without departing from the disclosure.

As used herein, an XOR operation compares the first value to the second value to identify when they are different. For example, the XOR operation may result in a first binary value (e.g., 0) when the first value is equal to the second value (e.g., both the first value and the second value have a value of zero or a value of one) and may result in a second binary value (e.g., 1) when the first value is different than the second value (e.g., the first value is equal to zero and the second value is equal to one, or the first value is equal to one and the second value is equal to zero). This is illustrated in the XOR truth table, shown below.

TABLE 1

XOR Truth Table

| INPUT | | OUTPUT |
|---|---|---|
| A | B | |
| 0 | 0 | 0 |
| 0 | 1 | 1 |
| 1 | 0 | 1 |
| 1 | 1 | 0 |

As illustrated in FIG. 3B, the audio type detection chart 370 represents the first binary value (e.g., 0) using a dark shade of gray and represents the second binary value (e.g., 1) using a light shade of gray. For example, the SSL1 data 332 is equal to the WW detection data 350 for an entirety of the first time window, resulting in the SSL1 data 332 being represented using the dark shade of gray throughout the first time window. Similarly, the SSL2 data 334 is also equal to the WW detection data 350 for the entirety of the first time window, resulting in the SSL2 data 334 also being represented using the dark shade of gray throughout the first time window. In contrast, the SSL3 data 336 is different than the WW detection data 350 for the entirety of the first time window, resulting in the SSL3 data 336 being represented using the light shade of gray throughout the first time window. Finally, the SSL4 data 338 is equal to the WW detection data 350 for a short portion of the first time window (e.g., one third), resulting in the SSL4 data 338 being represented using the dark shade of gray for a first third of the first time window and the light shade of gray for the second third and the final third of the first time window.

FIG. 3B illustrates a simple example of calculating the correlation data 380 based entirely on the XOR operation described above. As illustrated in FIG. 3B, a first portion of the correlation data 380 corresponds to a first correlation value (e.g., 1.0), indicating that the SSL1 data 332 is strongly correlated with the WW detection data 350 during the first time window in which the wakeword is represented. Similarly, a second portion of the correlation data 380 corresponds to a second correlation value (e.g., 1.0*), indicating that the SSL2 data 334 is also strongly correlated with the WW detection data 350 during the first time window. In contrast, a third portion of the correlation data 380 corresponds to a third correlation value (e.g., 0.0), indicating that the SSL3 data 336 is not at all correlated with the WW detection data 350 during the first time window. Similarly, a fourth portion of the correlation data 380 corresponds to a fourth correlation value (e.g., 0.33), indicating that the SSL4 data 338 is only weakly correlated with the WW detection data 350 during the first time window (e.g., correlated one third of the time).

While FIG. 3B illustrates that the first correlation value is equal to the second correlation value, the second correlation value includes an asterisk (*) to indicate that while the SSL2 data 334 is strongly correlated with the WW detection data 350 within the first time window, the SSL2 data 334 is not correlated with the WW detection data 350 outside of the first time window and/or based on a start time or an end time. Thus, while FIG. 3B illustrates an example in which the SSL2 data 334 is as strongly correlated as the SSL1 data 332 based on the simple illustration of comparing values within the first time window, the device 110 may be configured to calculate the correlation data 380 using additional information that would distinguish the SSL2 data 334 from the WW detection data 350 without departing from the disclosure.

To illustrate an example, the device 110 may determine a first timestamp corresponding to a beginning (e.g., start time) and a second timestamp corresponding to an ending (e.g., end time) of a first pulse represented in the WW detection data 350 during the first time window. Similarly, the device 110 may determine a third timestamp corresponding to a beginning and a fourth timestamp corresponding to an ending of a second pulse represented in the SSL1 data 332 during the first time window. Finally, the device 110 may determine a fifth timestamp corresponding to a beginning and a sixth timestamp corresponding to an ending of a third pulse represented in the SSL2 data 334 during the first time window.

In some examples, the device 110 may determine the first correlation value represented in the correlation data 380 in part by comparing the first timestamp to the third timestamp and/or comparing the second time stamp to the fourth timestamp. For example, the device 110 may identify that the first timestamp and the third timestamp are approximately equal and that the second timestamp and the fourth timestamp are approximately equal, which indicates that the second pulse represented in the SSL1 data 332 corresponds to the start time and end time of the first pulse represented in the WW detection data 350 (e.g., strong correlation).

Similarly, the device 110 may determine the second correlation value represented in the correlation data 380 in part by comparing the first timestamp to the fifth timestamp and/or comparing the second time stamp to the sixth timestamp. For example, the device 110 may identify that the fifth timestamp is different than the first timestamp and that the sixth timestamp is different than the fourth timestamp, which indicates that the third pulse represented in the SSL2 data 334 does not correspond to the first pulse represented in the WW detection data 350 (e.g., weak correlation). Thus, while the third pulse matches the first pulse during the first time window, the device 110 would determine the second correlation value to be lower than the first correlation value based on the start time and end time of the third pulse. In some examples, the second correlation value may depend on weight values associated with the first time window, the start time, and/or the end time. Thus, the device 110 may choose to weight each comparison differently without departing from the disclosure.

Based on the correlation data 380 and/or the additional information, the device 110 may determine that the SSL1 data 332 has a strongest correlation with the WW detection data 350 and may associate the wakeword with the SSL1 data 332 and/or the first sound source (e.g., SSL1 and/or the first user 5a). Thus, the device 110 may determine that the first sound source corresponds to a human and/or that the SSL1 data 332 indicates speech represented in the audio data (e.g., voice command or other utterance).

While not illustrated in FIG. 3B, in some examples the device 110 may generate the correlation data 380 in part based on the best beam data 340. To illustrate an example, the device 110 may compare a location of each of the portions of the SSL data 330 to a location associated with the best beam data 340. For example, if the best beam data 340 associates the best beam with a first direction (e.g., first value in degrees) relative to the device 110 at a first time, the device 110 may compare the first direction to a second direction (e.g., second value in degrees) associated with the first sound source (e.g., SSL1 data 332) at the first time. In some examples, the device 110 may determine an absolute value of the difference between the first value and the second value and divide the absolute value by 180 degrees, although the disclosure is not limited thereto. Similarly, the device 110 may compare the first direction to a third direction (e.g., third value in degrees) associated with the second sound source (e.g., SSL2 data 334) at the first time. Thus, the device 110 may determine a second absolute value of the difference between the first value and the third value and divide the second absolute value by 180 degrees, although the disclosure is not limited thereto.

Figure 4A:
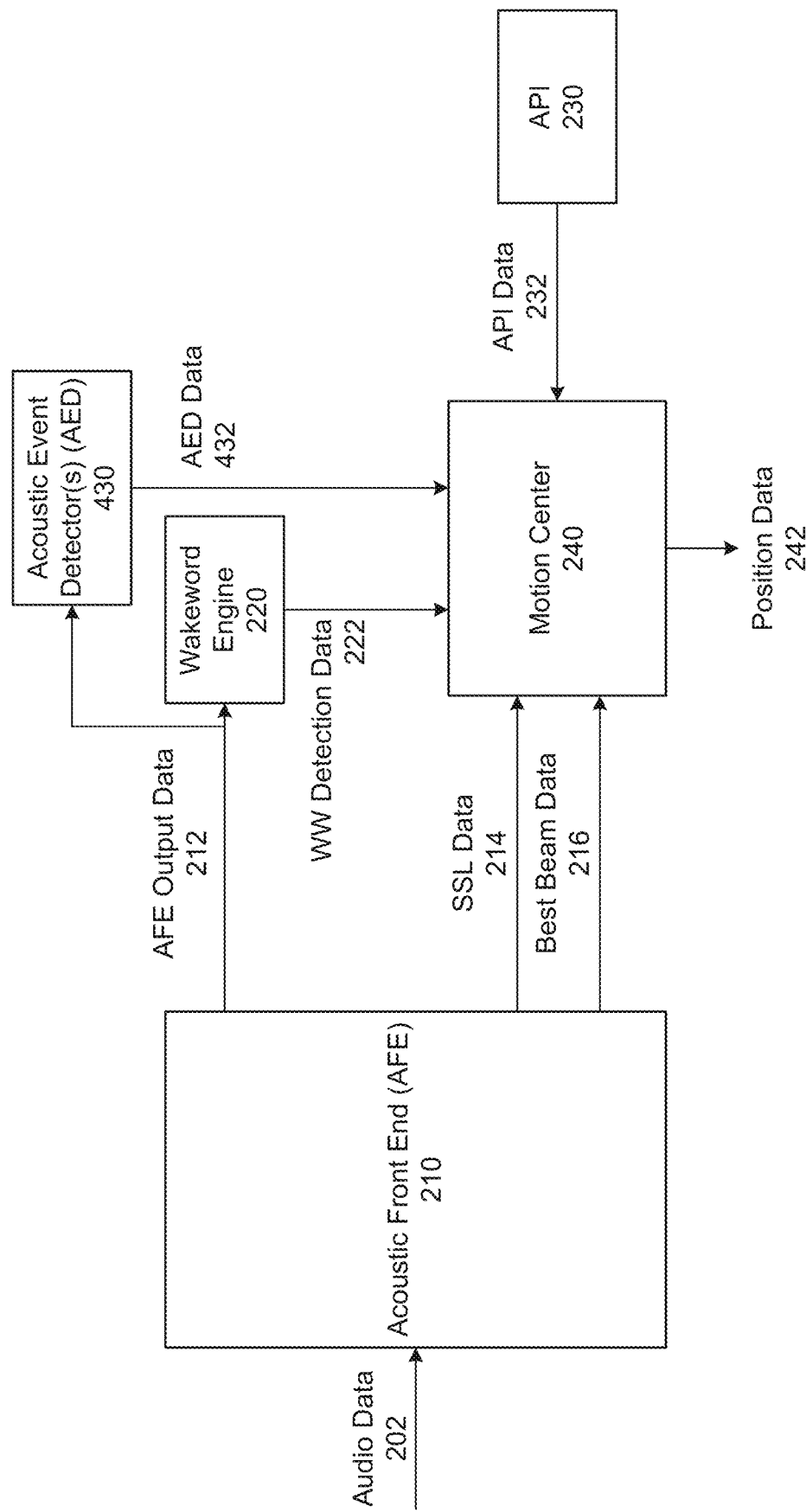

FIGS. 4A-4B illustrate example component diagrams of an audio type detection system using acoustic event detectors according to examples of the present disclosure. As illustrated in FIG. 4A, the device 110 may perform audio type detection 400 using one or more acoustic event detector(s) (AED) 430. As most of the components illustrated in FIG. 4A were described in detail above with regard to FIGS. 2A-2C, a redundant description is omitted.

In the example illustrated in FIG. 4A, the AFE component 210 may send the AFE output data 212 to the wakeword engine 220 and to the one or more AED(s) 430. However, the disclosure is not limited thereto, and in some examples the AFE component 210 may generate first AFE output data 212a for the wakeword engine 220 and may generate second AFE output data 212b for the one or more AED(s) 430 without departing from the disclosure. Additionally or alternatively, the AFE component 210 may generate unique AFE output data 212 for individual AEDs 430 without departing from the disclosure. Thus, in some examples the AFE component 210 may be configured to generate AFE output data 212 based on the AED 430, although the disclosure is not limited thereto.

An individual AED 430 may be configured to detect a particular acoustic event represented in the AFE output data 212. For example, the AED 430 may process the AFE output data 212 to perform acoustic event detection and generate AED data 432 indicating when the acoustic event is detected. To illustrate an example, a first AED 430a may be configured to detect speech and may generate first AED data 432a indicating when speech is represented in the audio data 202. In addition, a second AED 430b may be configured to detect sounds associated with pets (e.g., dogs barking, etc.) and may generate second AED data 432b indicating when pet sounds are represented in the audio data 202. The device 110 may include additional AEDs 430 without departing from the disclosure. However, the disclosure is not limited thereto and in some examples a single AED 430 may be configured to detect multiple acoustic events without departing from the disclosure.

The AED(s) 430 may send the AED data 432 to the motion center 240 and the motion center 240 may use the AED data 432 to identify additional audio types. For example, the motion center 240 may perform the steps described above, using the AED data 432 instead of the WW detection data 222, in order to associate a sound source represented in the SSL data 214 with an acoustic event and/or audio type. To illustrate an example, if the device 110 includes the first AED 430a configured to detect speech, the motion center 240 may associate the SSL2 data 334 and the SSL3 data 336 with human speech. Thus, the device 110 may determine that the second sound source and the third sound source correspond to the second user 5b and the third user 5c, despite the users not speaking the wakeword.

To illustrate another example, if the device 110 includes the second AED 430b configured to detect pet sounds, the motion center 240 may associate the SSL4 data 338 with the pet 10. Thus, the device 110 may determine that the fourth sound source corresponds to the pet 10, which the device 110 is unable to determine using the wakeword engine 220 alone.

While FIG. 4A illustrates an example in which the motion center 240 receives the WW detection data 222 from the wakeword engine 220 and the AED data 432 from one or more acoustic event detector(s) 430, the disclosure is not limited thereto. In some examples, for example, the motion center 240 may only receive the AED data 432 from the one or more acoustic event detector(s) 430 without departing from the disclosure. Thus, in some examples the motion center 240 may determine the position data 242 without receiving the WW detection data 222 from the wakeword engine 220 without departing from the disclosure.

In some examples, the device 110 may determine confidence score data corresponding to the SSL data 214 and/or the AED data 432. For example, FIG. 4B illustrates an example of the device 110 performing audio type detection 450 in which the AFE component 210 may generate AFE confidence data 218 corresponding to the SSL data 214 and/or the AED(s) 430 may generate AED confidence data 434 corresponding to the AED data 432. While FIG. 4B illustrates an example of the device 110 generating both the AFE confidence data 218 and the AED confidence data 434, the disclosure is not limited thereto and the device 110 may generate the AFE confidence data 218 or the AED confidence data 434 without departing from the disclosure. Additionally or alternatively, while FIG. 4B illustrates an example of the device 110 generating the AFE confidence data 218 and the AED confidence data 434 in addition to the best beam data 216 and/or the API data 232, the disclosure is not limited thereto and the device 110 may generate any combination of the best beam data 216, the AFE confidence data 218, the AED confidence data 434, and/or the API data 232 without departing from the disclosure.

As the AFE confidence data 218 is described above with regard to FIG. 2C, a corresponding description is omitted. Additionally or alternatively, while FIG. 4B does not illustrate the WW confidence data 224, the wakeword engine 220 may generate the WW confidence data 224 described above with regard to FIG. 2C and may send the WW confidence data 224 to the motion center 240 without departing from the disclosure.

In the audio type detection 450 example illustrated in FIG. 4B, the motion center 240 is configured to process the SSL data 214, the best beam data 216, the AFE confidence data 218, the WW detection data 222, the AED data 432, the AED confidence data 434, and/or the API data 232 to generate the position data 242 corresponding to the sound sources. Thus, the motion center 240 may be configured to track a sound source over time as described above with regard to FIG. 2A without departing from the disclosure. For example, the motion center 240 may enable the device 110 to track the sound source even as the device 110 and/or the sound source move relative to each other. In some examples, the position data 242 may include a unique identification indicating an individual sound source, along with information about a position of the sound source relative to the device 110, a location of the sound source using a coordinate system or the like, an audio type associated with the sound source, additional information about the sound source (e.g., user identification, type of sound source, etc.), and/or the like, although the disclosure is not limited thereto.

As discussed above with regard to FIG. 2A, the AFE component 210 may generate timestamp data corresponding to a series of timestamps using a global clock signal. Thus, the AFE component 210 may embed the timestamp data in the AFE output data 212, the SSL data 214, the best beam data 216, and/or the AFE confidence data 218 and/or the AFE component 210 may expose the timestamp data to the wakeword engine 220, the AED(s) 430, and/or the API component 230 to enable the device 110 to synchronize multiple components using the timestamp data. While the device 110 may align the timeline between each of the components (e.g., synchronize data generated by each of these components using the global clock signal), the components may exhibit different and/or varying propagation delays and other processing delays. As a result, the information represented in the AFE output data 212, the SSL data 214, the best beam data 216, the AFE confidence data 218, the WW detection data 222, the AED data 432, the AED confidence data 434, and/or the API data 232 may correspond to a single event but may be associated with different timestamps. For example, in response to a user saying the wakeword, the WW detection data 222 may indicate that a wakeword is represented during a first time range, while the SSL data 214 may indicate that an audible sound associated with a first sound source is detected during a second time range that is slightly different than the first time range. Therefore, the WW detection data 222 and/or the AED data 432 may not align perfectly with audible sounds represented in the SSL data 214, but the motion center 240 may determine similarities based on a correlation between them.

In some examples the motion center 240 may generate the position data 242 by calculating correlation data between each of the individual SSL tracks and the AED data 432. For example, the device 110 may calculate first correlation data that includes correlation values (e.g., ranging from 0.0 to 1.0) indicating a similarity between each of the individual SSL tracks and a first acoustic event represented in the AED data 432. The motion center 240 may then use the first correlation data to determine which of the individual SSL tracks corresponds to the first acoustic event. For example, if the first correlation data includes a first correlation value (e.g., 0.88) associated with a first sound source and a second correlation value (e.g., 0.33) associated with a second sound source, the motion center 240 may determine that the first correlation value is a highest correlation value included in the first correlation data and associate the first sound source with the first acoustic event.

In some examples, the motion center 240 may generate the position data 242 using the SSL data 214 and the AED confidence data 434. For example, if the AED confidence data 434 indicates a likelihood that an individual SSL track corresponds to a particular acoustic event (e.g., speech, pet noises, mechanical noises, etc.), the motion center 240 may generate the first correlation data described above and then generate second correlation data using a weighted sum of the first correlation data and the AED confidence data 434, although the disclosure is not limited thereto. For example, if the first correlation data includes a first correlation value (e.g., 0.88) associated with a first sound source and a second correlation value (e.g., 0.33) associated with a second sound source, and the AED confidence data 434 includes a first confidence value (e.g., 0.75) associated with the first sound source and a second confidence value (e.g., 0.25) associated with the second sound source, the motion center 240 may generate second correlation data including a first value (e.g., 0.88*0.75=0.66) corresponding to the first sound source and a second value (e.g., 0.33*0.25=0.0825) corresponding to the second sound source. Thus, the motion center 240 may determine that the first value is a highest value included in the second correlation data and associate the first sound source with the first acoustic event. However, this example is intended to conceptually illustrate a simple example and the disclosure is not limited thereto.

In other examples, the motion center 240 may include a machine learning model, such as a deep neural network (DNN) or the like, without departing from the disclosure. For example, the motion center 240 may be configured to process the SSL data 214, the best beam data 216, the AFE confidence data 218, the WW detection data 222, the WW confidence data 224, the AED data 432, the AED confidence data 434, the API data 232, and/or additional data using the machine learning model to generate the position data 242 corresponding to the sound sources.

To illustrate a simple example, the motion center 240 may generate the first correlation data using the SSL data 214 and the AED data 432, as described above, and may input the first correlation data and the AED confidence data 434 to the machine learning model. Instead of generating the weighted sum described above, however, the machine learning model may generate output confidence data including confidence scores for each of the individual SSL tracks. In this example, the motion center 240 may determine that a first output confidence value corresponding to the first sound source is a highest output confidence value of the output confidence data and associate the first sound source with the first acoustic event. The disclosure is not limited thereto, however, and in other examples the machine learning model may generate output data without the motion center 240 calculating the first correlation data without departing from the disclosure.

To illustrate another example, the motion center 240 may input the SSL data 214, the best beam data 216, the AFE confidence data 218, the WW detection data 222, the WW confidence data 224, the AED data 432, the AED confidence data 434, and/or the API data 232 to the machine learning model to generate the output data. The output data may correspond to correlation values (e.g., similarity between each of the SSL tracks and the AED data 432 during the acoustic event), confidence values (e.g., likelihood that each of the SSL tracks corresponds to the acoustic event), SSL type data (e.g., indicating a type of acoustic event associated with each of the SSL tracks), and/or the like without departing from the disclosure.

Figure 5:
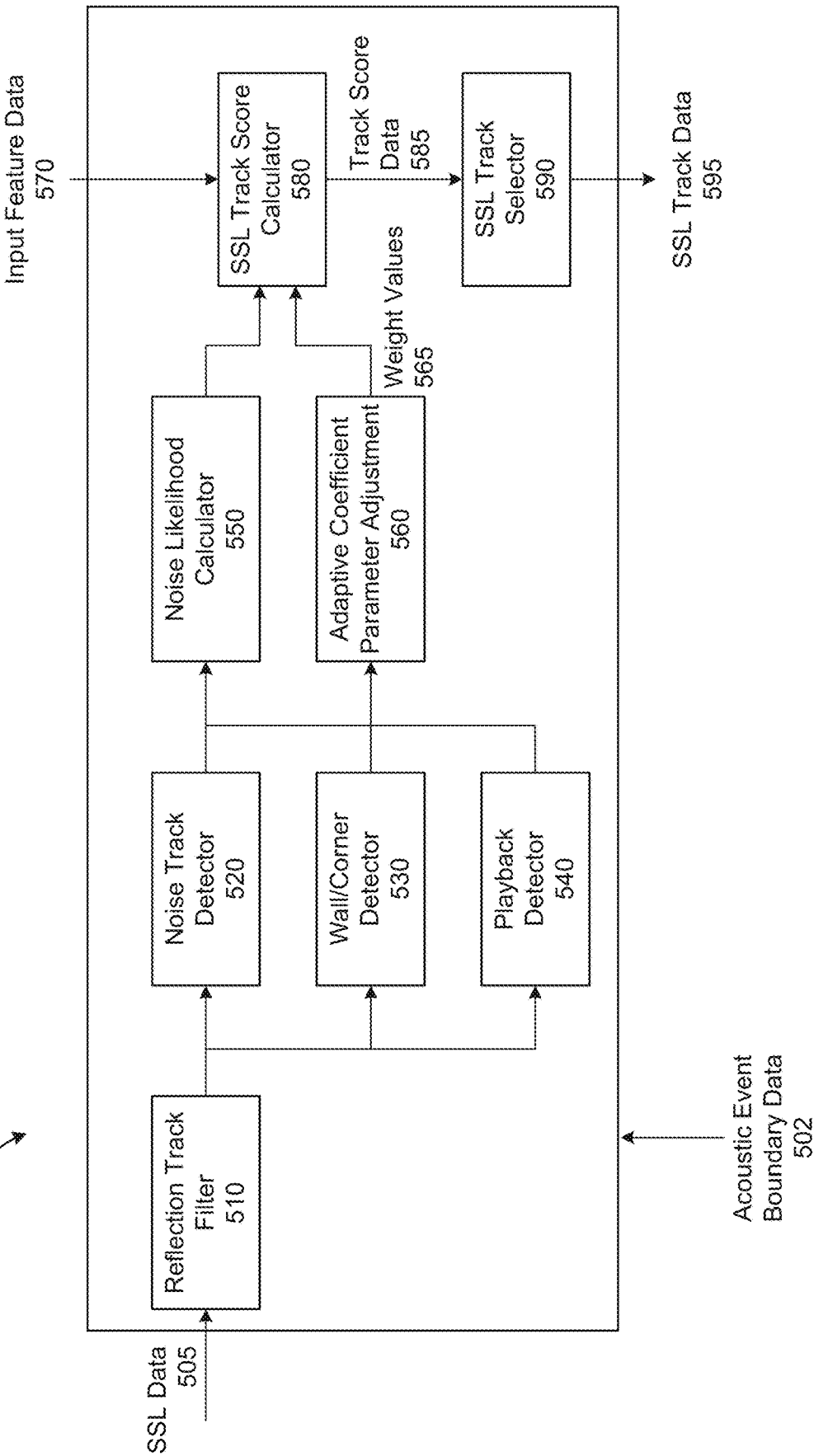
FIG. 5 illustrates an example component diagram for performing track selection according to embodiments of the present disclosure.

FIG. 5 illustrates an example component diagram for performing track selection according to embodiments of the present disclosure. The device 110 may perform track selection as part of performing audio type detection, which is described in greater detail above. For example, the device 110 may detect an acoustic event that is represented in audio data, such as a wakeword or other audible sound, and may determine acoustic event boundary data 502 for the acoustic event. The device 110 may use the acoustic event boundary data 502 to perform SSL track selection 500 to select an individual SSL track that corresponds to the acoustic event. For example, the device 110 may determine input features associated with each of the SSL tracks included in the SSL data and may use the input features to determine an SSL track score for each of the SSL tracks. The device 110 may associate the SSL track having a highest SSL track score with the acoustic event.

As illustrated in FIG. 5, the device 110 may perform the SSL track selection 500 using a plurality of components, including a reflection track filter component 510, a noise track detector component 520, a wall/corner detector component 530, a playback detector component 540, a noise likelihood calculator component 550, an adaptive coefficient parameter adjustment component 560, an SSL track score calculator component 580, and/or an SSL track selector component 590, although the disclosure is not limited thereto. However, while FIG. 5 illustrates each step as a separate component, the disclosure is not limited thereto and a single component can perform one or more steps illustrated in FIG. 5 without departing from the disclosure.

As illustrated in FIG. 5, the reflection track filter component 510 may receive SSL data 505 generated by the AFE component 210, such as the SSL data 214. For example, the SSL data 505 may indicate a power value and a confidence value generated by the AFE component 210, although the disclosure is not limited thereto. The reflection track filter component 510 may identify which of the SSL tracks correspond to an original audio source (e.g., direct SSL tracks) and which of the SSL tracks correspond to a reflection of the sound source (e.g., reflected SSL tracks). While FIG. 5 only illustrates the reflection track filter component 510 receiving the SSL data 505, the disclosure is not limited thereto and the reflection track filter component 510 may receive additional inputs not illustrated in FIG. 5 without departing from the disclosure. For example, the AFE component 210 may determine whether an individual SSL track corresponds to a direct SSL track or a reflected SSL track and may send information to the reflection track filter component 510. Additionally or alternatively, the reflection track filter component 510 may process power values, confidence values, correlation values, timing information and/or additional data in order to distinguish direct SSL tracks from reflected SSL tracks.

Ideally, the SSL track selection 500 would select from the direct SSL tracks and not select one of the reflected SSL tracks. To avoid selecting one of the reflected SSL tracks, some conventional systems may remove the reflected SSL tracks entirely. However, if the reflection track filter component 510 misidentifies a direct SSL track as a reflected SSL track, removing all of the reflected SSL tracks may result in the device 110 selecting the wrong SSL track for the acoustic event.

Instead of removing the reflected SSL tracks completely, in some examples the device 110 may reduce a confidence score associated with a reflected SSL track. For example, the device 110 may set the confidence score to a first value (e.g., 0.5), an average of a track power value and a correlation value, and/or the like without departing from the disclosure. Thus, the device 110 may reduce the likelihood that the reflected SSL track is selected during SSL track selection 500, without discarding each of the reflected SSL tracks entirely. For example, the device 110 may still determine that the acoustic event corresponds to one of the reflected SSL tracks despite the reduced confidence score.

The reflection track filter component 510 may output modified SSL data to multiple components that are configured to detect specific environment conditions. For example, the noise track detector 520 may be configured to detect SSL tracks within one or more time intervals prior to the acoustic event boundary, the wall/corner detector component 530 may be configured to detect whether the device 110 is in proximity to one or more walls or other acoustically reflective surfaces, and the playback detector 540 may be configured to detect playback conditions when playback audio is being generated.

The noise track detector 520 may determine a portion of the SSL data that is active in a time interval prior to the acoustic event boundary indicated by the acoustic event boundary data 502. For example, the device 110 may determine individual SSL tracks that are active within a long-term noise window and/or a short-term noise window prior to the acoustic event boundary. The noise track detector 520 may determine noise time interval settings based on previous noise time interval settings, historical data, user preferences, and/or the like. In some examples, the long-term noise window may correspond to a first time (e.g., 10 seconds) and the short-term noise window may correspond to a second time (e.g., 1 second), although the disclosure is not limited thereto. For example, if the device 110 detects a beginning of the acoustic event at a first time (e.g., acoustic event boundary extends from the first time to an end of the acoustic event), the first time interval may extend from a second time (e.g., ten seconds before the first time) to a third time (e.g., one second before the first time), while the second time interval may extend from a fourth time (e.g., one second before the first time) to a fifth time (e.g., 500 ms before the first time), although the disclosure is not limited thereto.

Figure 6:
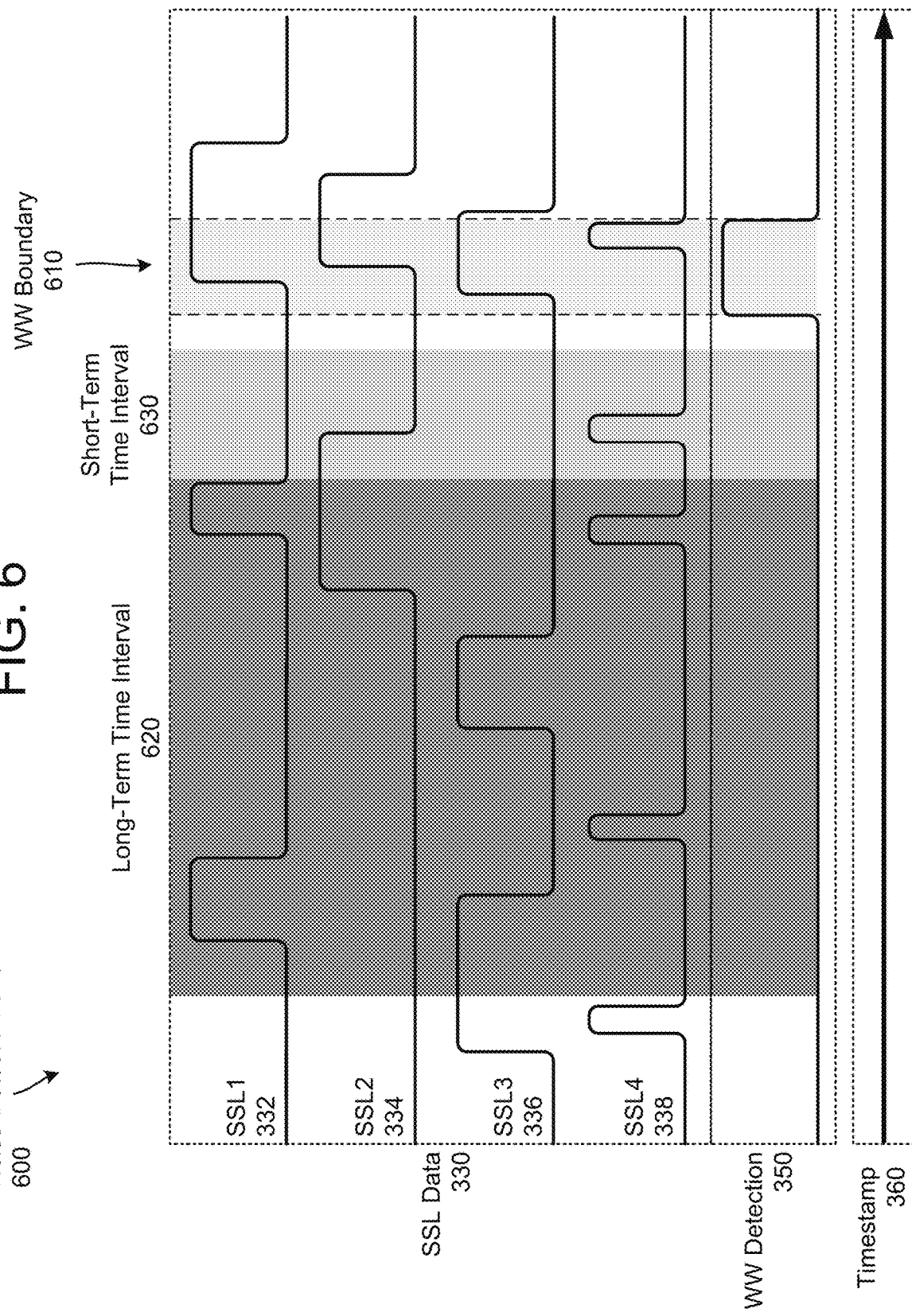
FIG. 6 illustrates an example of performing short-term and long-term noise track detection according to embodiments of the present disclosure.

FIG. 6 illustrates an example of performing short-term and long-term noise track detection according to embodiments of the present disclosure. As illustrated in noise detection chart 600, the device 110 may determine a wakeword boundary 610 corresponding to the WW detection data 350, with a beginning of the wakeword boundary 610 indicating a beginning of the wakeword represented in the WW detection data 350.

Based on the WW boundary 610, the device 110 may determine a long-term time interval 620 and a short-term time interval 630. Thus, the device 110 may determine a first number of active SSL tracks represented during the long-term time interval 620, a second number of active SSL tracks represented during the short-term time interval 630, and/or a third number of active SSL tracks represented during either the long-term time interval 620 or the short-term time interval 630. For example, FIG. 6 illustrates that four SSL tracks are active at different times during the long-term time interval 620, while two SSL tracks are active during the short-term time interval 630.

Referring back to FIG. 5, the noise track detector 520 may determine a noise level of the environment (e.g., whether the environment is noisy) based on the number of unique SSL tracks active in the time interval prior to the acoustic event boundary. For example, the noise track detector 520 may detect a noisy environment when the number of unique SSL tracks exceeds a first threshold value (e.g., value of 4, although the disclosure is not limited thereto), whereas the noise track detector 520 may detect a quiet environment when the number of unique SSL tracks is below the first threshold value. Using this example, the noise detection chart 600 illustrated in FIG. 6 corresponds to a quiet environment and the device 110 may detect quiet conditions. However, the disclosure is not limited thereto, and the noise track detector 520 may detect noisy conditions using other techniques without departing from the disclosure. For example, the noise track detector 520 may detect a noisy environment when a power value associated with the portion of the SSL data (e.g., average power value, maximum power value, and/or the like) exceeds a threshold value without departing from the disclosure.

The wall/corner detector component 530 may determine whether the device 110 is in proximity to one or more walls (e.g., near a wall, in a corner, etc.) based on a number of reflection tracks that are active in the time interval prior to the acoustic event boundary. For example, the wall/corner detector component 530 may determine that the device 110 is in proximity to one or more walls (e.g., wall/corner classification) or other acoustically reflective surfaces when a percentage of active SSL tracks that correspond to reflections exceeds a second threshold value (e.g., 50%, although the disclosure is not limited thereto), whereas the wall/corner detector component 530 may determine that the device 110 is not in proximity to a wall (e.g., center classification) when the percentage of active SSL tracks that correspond to reflections is below the second threshold value. However, the disclosure is not limited thereto, and the device 110 may detect a position of the device 110 relative to acoustically reflective surfaces using other techniques without departing from the disclosure.

The playback detector component 540 may determine whether playback conditions are present based on a number of SSL tracks that are active in the time interval prior to the acoustic event boundary and that correspond to an echo signal. For example, the playback detector component 540 may detect playback conditions when one or more SSL tracks correspond to a loudspeaker or other sound source that generates playback audio. In some examples, the playback detector component 540 may track location(s) of sound source(s) that are associated with playback audio over time, such that the playback detector component 540 may identify whether one of the active SSL tracks corresponds to the known location(s). However, the disclosure is not limited thereto, and the device 110 may detect playback conditions using other techniques without departing from the disclosure. For example, the device 110 may detect playback conditions whenever the device 110 is sending playback audio data to a loudspeaker, without regard to the SSL data, without departing from the disclosure.

In some examples, the playback detector component 540 may receive information from the AFE component 210 that is not illustrated in FIG. 5. For example, the AFE component 210 may detect playback and send a playback signal to the playback detector component 540 indicating that playback is detected, although the disclosure is not limited thereto. Additionally or alternatively, the playback detector component 540 may receive volume information, echo return loss enhancement (ERLE) data associated with acoustic echo cancellation (AEC) processing, and/or the like without departing from the disclosure. For example, the playback detector component 540 may apply first adaptive coefficient values when playback is not detected, may apply second adaptive filter coefficient values when playback is detected but the volume level is low, and may apply third adaptive coefficient values when playback is detected but the volume level is high, although the disclosure is not limited thereto.

The noise likelihood calculator component 550 may detect SSL tracks active within the short-term time interval that overlap the acoustic event and may generate a noise map using the detected SSL tracks. For example, the noise likelihood calculator component 550 may determine that a plurality of SSL tracks were active within the short-term time interval and may generate the noise map indicating a location for each of the plurality of SSL tracks. In some examples, the noise map indicates a noise-likelihood value for all directions (e.g., 360 degrees) around the device 110. Thus, an SSL track associated with noise will be represented in the noise map by high noise-likelihood values that correspond to a direction of the SSL track. The noise likelihood calculator component 550 may generate the noise map and then determine a single noise likelihood value corresponding to the SSL track, although the disclosure is not limited thereto.

The noise likelihood calculator component 550 may determine confidence value(s) based on the noise-likelihood measurements. For example, if a first SSL track is active during the short-term time interval (e.g., prior to the acoustic event being detected) and overlaps the acoustic event, the noise likelihood calculator component 550 may infer that the first SSL track does not correspond to the acoustic event and may reduce a confidence score for the first SSL track accordingly.

The noise likelihood calculator component 550 only determines the confidence value(s) for the selected SSL tracks that are active in the short-term time interval and overlap the acoustic event. In some examples, the noise likelihood calculator component 550 may determine a new confidence value (e.g., replace a first confidence value with a second confidence value) by determining the noise-likelihood measurement and subtracting the noise-likelihood measurement from a value of one. For example, if the noise likelihood calculator component 550 determines that the noise-likelihood measurement is a first value (e.g., 0.7), the noise likelihood calculator component 550 may determine a new confidence value equal to a second value (e.g., 1.0-0.7=although the disclosure is not limited thereto.

The adaptive coefficient parameter adjustment component 560 may determine adaptive coefficient parameter values based on the environment conditions detected by the noise track detector component 520, the wall/corner detector component 530, and/or the playback detector component 540, although the disclosure is not limited thereto. The adaptive coefficient parameter values may correspond to weight values 565 associated with input feature data 570 (e.g., input features), enabling the SSL track score calculator component 580 to determine track score data 585 by calculating a weighted sum of the input feature data 570. For example, if the device 110 calculates the track score data using a first number of input features (e.g., 3, although the disclosure is not limited thereto), the adaptive coefficient parameters may include the first number of weight values.

The input feature data 570 may include power values (e.g., total power, average power, maximum value, and/or the like associated with an individual SSL track), confidence values (e.g., likelihood that each of the SSL tracks corresponds to the wakeword event), correlation values (e.g., similarity between each of the SSL tracks and the wakeword data during the wakeword event), SSL type data (e.g., indicating a type of acoustic event associated with each of the SSL tracks), and/or the like without departing from the disclosure.

To illustrate an example, the input feature data 570 may include a first track power value indicating an amount of power associated with the first SSL track (SSL1), a first confidence value indicating a first likelihood that the first SSL track (SSL1) corresponds to the wakeword event, and a first correlation value indicating a similarity between the first SSL track (SSL1) and the wakeword data representing the wakeword event. However, the disclosure is not limited thereto and the input feature data 570 may include additional values without departing from the disclosure.

To determine the track score data, the adaptive coefficient parameter adjustment component 560 may determine three adaptive coefficient parameter values corresponding to the input features; a first weight value corresponding to a first input feature (e.g., first track power value), a second weight value corresponding to a second input feature (e.g., first confidence value), and a third weight value corresponding to a third input feature (e.g., first correlation value).

The adaptive coefficient parameter adjustment component 560 may determine the adaptive coefficient parameter values in response to the current environment conditions. For example, the adaptive coefficient parameter adjustment component 560 may determine first weight values during first environment conditions (e.g., noisy environment, device 110 positioned near a wall or corner, etc.), may determine second weight values during second environment conditions (e.g., quiet environment, device 110 positioned away from a wall, etc.), and so on.

In some examples, during noisy conditions the adaptive coefficient parameter adjustment component 560 may select a relatively low value (e.g., 0.3) for the first weight value corresponding to the first input feature (e.g., first track power value) and select a relatively high value (e.g., 1.2) for the third weight value corresponding to the third input feature (e.g., first correlation value). In contrast, during quiet conditions the adaptive coefficient parameter adjustment component 560 may select a relatively high value (e.g., 1.4) for the second weight value corresponding to the second input feature (e.g., first confidence value), although the disclosure is not limited thereto.

Additionally or alternatively, when current environment conditions indicate that the device 110 is in proximity to a wall (e.g., wall/corner classification), the adaptive coefficient parameter adjustment component 560 may select a relatively low value (e.g., 0.3) for the third weight value corresponding to the third input feature (e.g., first correlation value). For example, the adaptive coefficient parameter adjustment component 560 may reduce the third weight value used to select the best SSL track because the cross-correlation value between a first SSL track that corresponds to a sound source and a second SSL track that corresponds to a reflection of the sound source may be almost identical. In contrast, when current environment conditions indicate that the device 110 is not in proximity to a wall (e.g., center classification), the adaptive coefficient parameter adjustment component 560 may select a value of one for the third weight value corresponding to the third input feature (e.g., first correlation value).

In some examples, when current environment conditions indicate that playback is detected, the adaptive coefficient parameter adjustment component 560 may select a relatively low value (e.g., 0.3) for the first weight value corresponding to the first input feature (e.g., first track power value). However, the disclosure is not limited thereto, and in other examples the first weight value may depend on volume information, echo return loss enhancement (ERLE) data associated with acoustic echo cancellation (AEC) processing, and/or the like without departing from the disclosure. For example, the playback detector component 540 may apply first adaptive coefficient values when playback is not detected, may apply second adaptive filter coefficient values when playback is detected but the volume level is low, and may apply third adaptive coefficient values when playback is detected but the volume level is high, although the disclosure is not limited thereto.

In some examples, the adaptive coefficient parameters are normalized values (e.g., values between 0.0 and 1.0), with a minimum value (e.g., 0.0) removing the corresponding input feature from the weighted sum and a maximum value (e.g., 1.0) passing the corresponding input feature without attenuation or adjustment. However, the disclosure is not limited thereto, and in other examples the adaptive coefficient parameters may have a maximum value above one (e.g., 1.3, although the disclosure is not limited thereto), such that the adaptive coefficient parameter may increase a weight of the corresponding input feature relative to the other input features.

In some examples, the SSL track score calculator component 580 may calculate a first track score value for the first SSL track (SSL1) by taking a first weighted sum of the first input features (e.g., first track power value, first confidence value, and first correlation value) and the adaptive coefficient parameter values (e.g., first weight value, second weight value, and third weight value), although the disclosure is not limited thereto. Similarly, the SSL track score calculator component 580 may calculate a second track score value for the second SSL track (SSL2) by taking a second weighted sum of second input features (e.g., second track power value, second confidence value, and second correlation value) and the adaptive coefficient parameter values (e.g., first weight value, second weight value, and third weight value). Thus, while the device 110 may vary the adaptive coefficient parameter values depending on the environment conditions, the same weight values are used to calculate each of the track score values included in the track score data.

As described above, the track score data 585 may include a unique track score value for each SSL track. For example, the SSL track score calculator component 580 may calculate the first track score value using the first input features and the weight values 565, the second track score value using the second input features and the weight values 565, and so on. In some examples, the first track score value may indicate a second likelihood that the first SSL track (SSL1) corresponds to the wakeword event. Thus, the device 110 may include the first confidence value (e.g., first confidence score) as one of the input features used to generate a second confidence value corresponding to the first SSL track. However, the disclosure is not limited thereto, and the first track score value may not indicate a likelihood that the first SSL track (SSL1) corresponds to the wakeword event without departing from the disclosure. For example, the first track score value may correspond to a first value (e.g., 1.3) and the second track score value may correspond to a second value (e.g., 0.8) without departing from the disclosure.

Using the track score data 585, the SSL track selector component 590 may select the SSL track that corresponds to the acoustic event and may generate SSL track data 595 indicating the selected SSL track. For example, the track score data 585 may determine that the first track score value (e.g., 1.3) is greater than the second track score value (e.g., 0.8) and may determine that the first SSL track associated with the first track score value corresponds to the acoustic event. Thus, the SSL track selector component 590 may associate the first sound source with the acoustic event. The SSL track data 595 may indicate the first SSL track, the first sound source, a position of the first sound source, and/or the like without departing from the disclosure.

Figure 7:
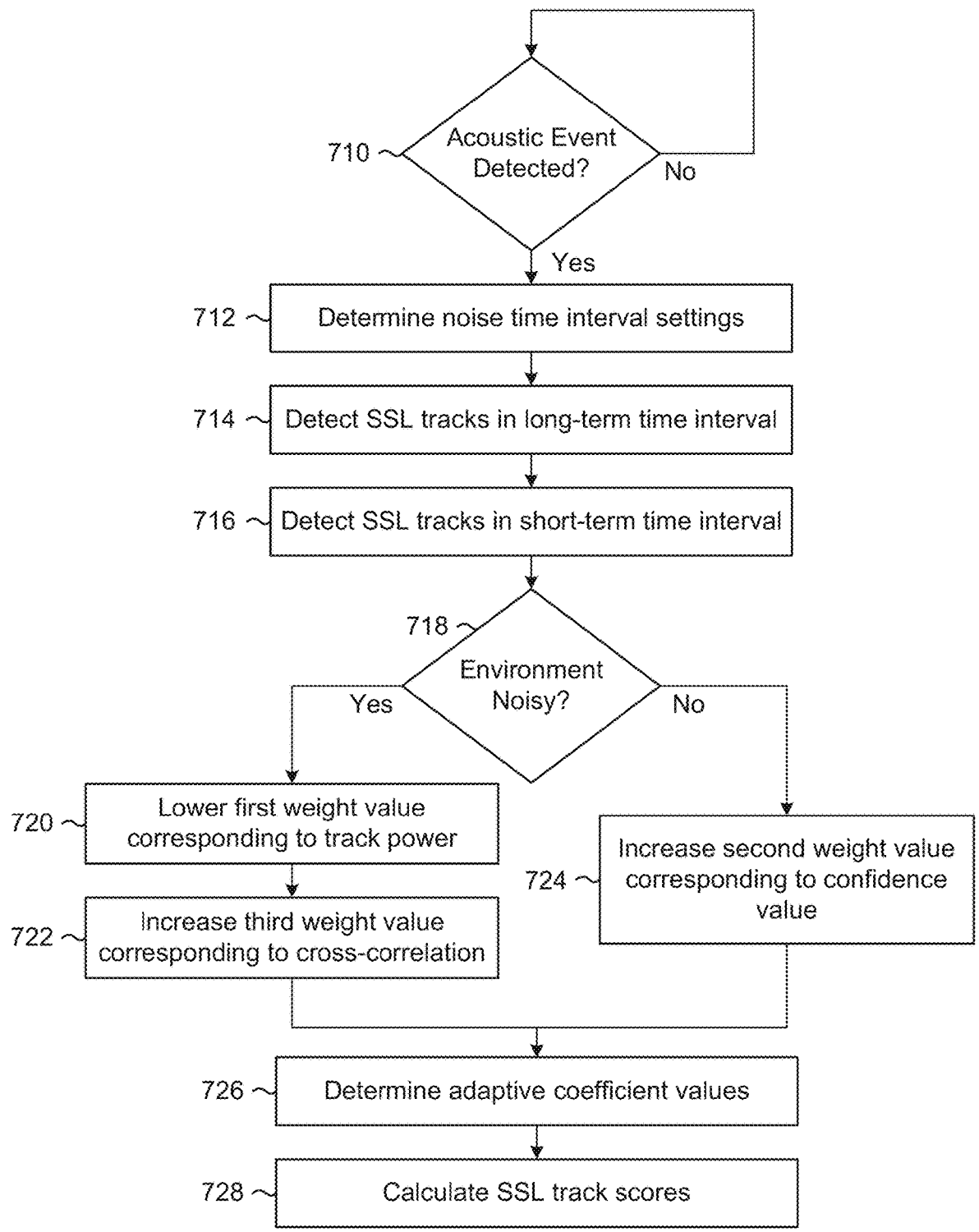
FIG. 7 is a flowchart illustrating an example method for adjusting adaptive coefficient values based on current conditions according to embodiments of the present disclosure.

FIG. 7 is a flowchart illustrating an example method for adjusting adaptive coefficient values based on current conditions according to embodiments of the present disclosure. As illustrated in FIG. 7, the device 110 may determine (710) whether an acoustic event is detected. If the acoustic event is not detected, the device 110 may continue to repeat step 710 until the acoustic event is detected.

Once the acoustic event is detected, the device 110 may determine (712) noise time interval settings based on previous noise time interval settings, historical data, user preferences, and/or the like. In some examples, the device 110 may determine noise time interval settings that include a first time interval corresponding to a long-term time interval (e.g., 10 seconds) and a second time interval corresponding to a short-term time interval (e.g., 1 second), although the disclosure is not limited thereto. For example, if the device 110 detects a beginning of the acoustic event at a first time (e.g., acoustic event boundary extends from the first time to an end of the acoustic event), the first time interval may extend from a second time (e.g., ten seconds before the first time) to a third time (e.g., one second before the first time), while the second time interval may extend from a fourth time (e.g., one second before the first time) to a fifth time (e.g., 500 ms before the first time), although the disclosure is not limited thereto.

The device 110 may detect (714) SSL tracks active within the long-term time interval, may detect (716) SSL tracks active in the short-term time interval, and may determine (718) whether the environment is noisy based on current conditions. For example, the device 110 may determine that a first portion of the SSL tracks were active during the long-term time interval and that a second portion of the SSL tracks were active during the short-term time interval. The first portion and the second portion may include overlapping SSL tracks, meaning that the SSL tracks were active during both the long-term time interval and the short-term time interval, as well as unique SSL tracks that were active only in the long-term time interval or the short-term time interval.

In some examples, the device 110 may determine whether the environment is noisy based on the total number of SSL tracks detected within the long-term time interval and the short-term time interval. For example, the device 110 may determine that the environment is noisy (e.g., detect noisy environment conditions) when the total number of SSL tracks is greater than a threshold value (e.g., 4) and may determine that the environment is quiet (e.g., detect quiet environment conditions) when the total number of SSL tracks is less than or equal to the threshold value. However, the disclosure is not limited thereto and the device 110 may determine that the environment is noisy using other techniques without departing from the disclosure. For example, the device 110 may determine that the environment is noisy based on a first number of SSL tracks detected within the long-term time interval, a second number of SSL tracks detected within the short-term time interval, a first power value (e.g., average power, total power, maximum power, etc.) associated with the long-term time interval, a second power value (e.g., average power, total power, maximum power, etc.) associated with the short-term time interval, and/or a combination thereof without departing from the disclosure.

If the device 110 determines that the environment is noisy, the device 110 may lower (720) a first weight value corresponding to track power values (e.g., power coefficient value) and may increase (722) a third weight value corresponding to cross-correlation values (e.g., correlation value). For example, the device 110 may set all weight values to a default value of one, but when noisy conditions are detected the device 110 may set the first weight value to a first value (e.g., 0.3) and the third weight value to a second value (e.g., 1.2), although the disclosure is not limited thereto. If the device 110 determines that the environment is not noisy, the device 110 may increase (724) a second weight value corresponding to the confidence value. For example, the device 110 may set all weight values to a default value of one, but when quiet conditions are detected the device 110 may set the second weight value to a third value (e.g., 1.3), although the disclosure is not limited thereto.

The device 110 may determine (726) adaptive coefficient values and may calculate (728) SSL track scores using the adaptive coefficient values. For example, steps 718-724 correspond to adjusting the adaptive coefficient values based on noise conditions, while step 726 may correspond to adjusting the adaptive coefficient values based on other conditions in the environment, such as whether playback audio is being generated, the device 110 is in proximity to a wall or not, and/or the like. As described above, the device 110 may calculate the SSL track scores using the adaptive coefficient values and the input features to generate a weighted sum for each of the SSL tracks.

Figure 8:
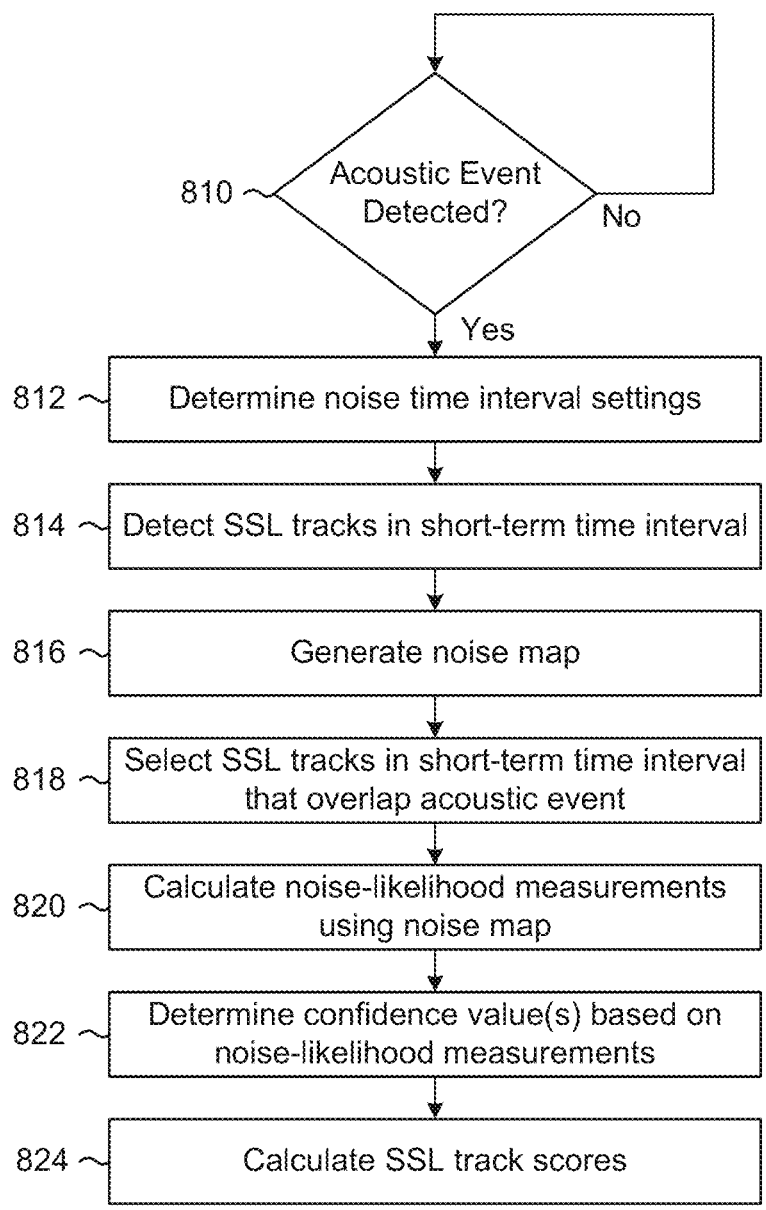
FIG. 8 is a flowchart illustrating an example method for performing noise likelihood measurements according to embodiments of the present disclosure.

FIG. 8 is a flowchart illustrating an example method for performing noise likelihood measurements according to embodiments of the present disclosure. As illustrated in FIG. 8, the device 110 may determine (810) whether an acoustic event is detected. If the acoustic event is not detected, the device 110 may continue to repeat step 810 until the acoustic event is detected.

Once the acoustic event is detected, the device 110 may determine (812) noise time interval settings based on previous noise time interval settings, historical data, user preferences, and/or the like. In some examples, the device 110 may determine noise time interval settings that include a first time interval corresponding to a short-term time interval (e.g., 1 second), although the disclosure is not limited thereto. For example, if the device 110 detects a beginning of the acoustic event at a first time (e.g., acoustic event boundary extends from the first time to an end of the acoustic event), the first time interval may extend from a second time (e.g., one second before the first time) to a third time (e.g., 500 ms before the first time).

The device 110 may detect (814) SSL tracks active within the short-term time interval and may generate (816) a noise map using the detected SSL tracks. For example, the device 110 may determine that a plurality of SSL tracks were active within the short-term time interval and may generate the noise map indicating a location for each of the plurality of SSL tracks.

The device 110 may select (818) SSL tracks active in the short-term time interval that overlap the acoustic event, may calculate (820) noise-likelihood measurements using the noise map, and may determine (822) confidence value(s) based on the noise-likelihood measurements. For example, if a first SSL track is active during the short-term time interval (e.g., prior to the acoustic event being detected) and overlaps the acoustic event, the device 110 may infer that the first SSL track does not correspond to the acoustic event and may reduce a confidence score for the first SSL track accordingly.

The device 110 only determines the confidence value(s) for the selected SSL tracks that are active in the short-term time interval and overlap the acoustic event. In some examples, the device 110 may determine a new confidence value (e.g., replace a first confidence value with a second confidence value) by determining the noise-likelihood measurement and subtracting the noise-likelihood measurement from a value of one. For example, if the device 110 determines that the noise-likelihood measurement is a first value (e.g., 0.7), the device 110 may determine a new confidence value equal to a second value (e.g., 1.0−0.7=0.3), although the disclosure is not limited thereto.

Using the new confidence value(s), the device 110 may calculate (822) the SSL track scores for each of the SSL tracks. For example, the device 110 may generate the weighted sum of input features using the adaptive coefficient values, as described above with regard to FIG. 7. Thus, the steps illustrated in FIG. 8 can be combined with other techniques, such as the steps illustrated in FIG. 7, without departing from the disclosure.

Figure 9:
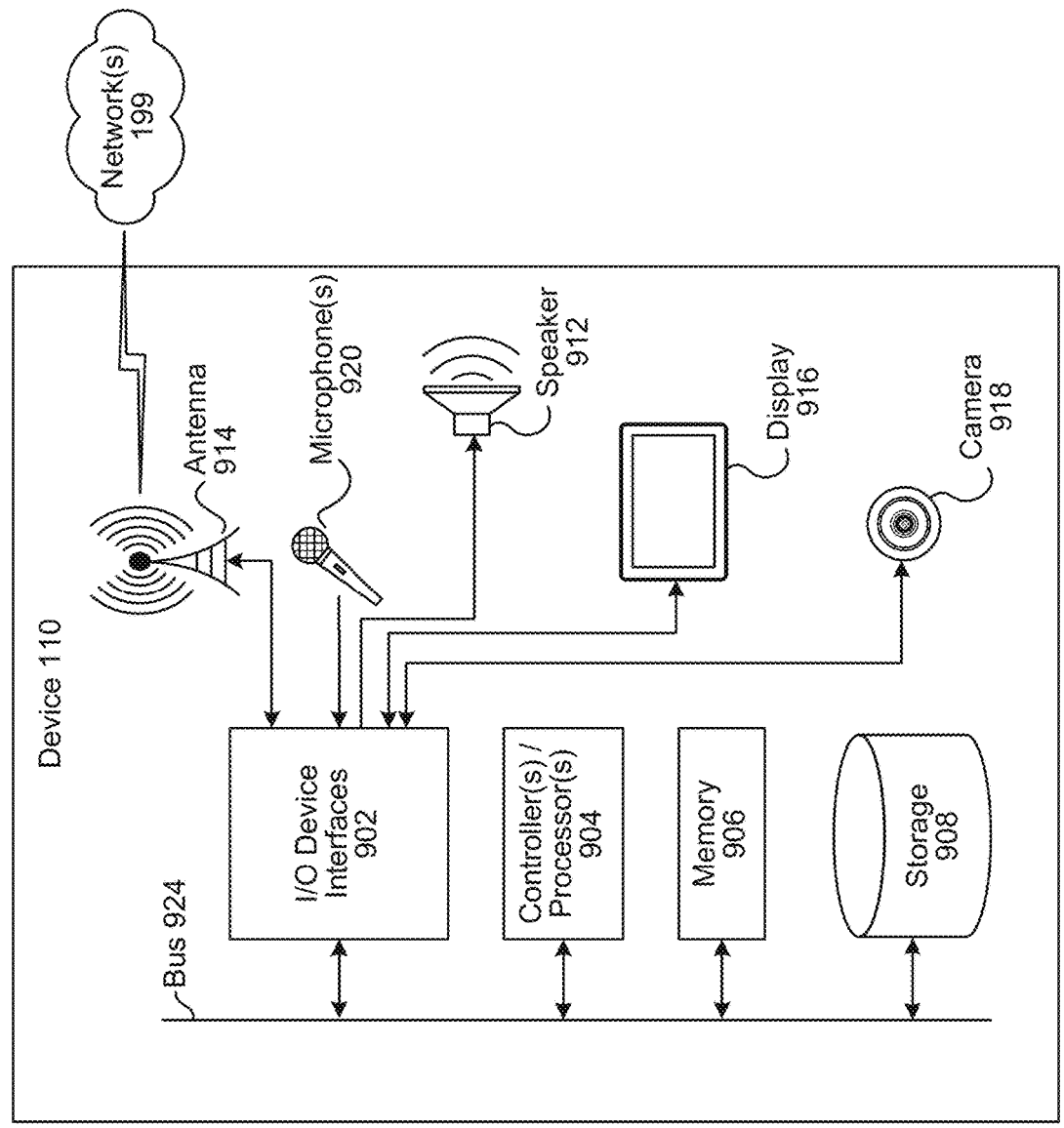
FIG. 9 is a block diagram conceptually illustrating example components of a device according to embodiments of the present disclosure.

FIG. 9 is a block diagram conceptually illustrating a device 110 that may be used with the system. FIG. 10 is a block diagram conceptually illustrating example components of a remote system 120, such as a natural language processing system(s), which may assist with natural language processing such as automatic speech recognition (ASR) processing, natural language understanding (NLU) processing, and/or the like. Multiple remote systems 120 may be included in the overall system 100 of the present disclosure, such as one or more natural language processing systems for performing ASR processing, one or more natural language processing systems for performing NLU processing, etc. In operation, each of these systems may include computer-readable and computer-executable instructions that reside on the respective system 120, as will be discussed further below.

A remote system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each device 110 and/or system 120 may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device 110 and/or system 120 may also include a data storage component (908/1008) for storing data and controller/processor-executable instructions. Each data storage component (908/1008) may individually include one or more non-volatile storage types such as magnetic storage, optical storage, solid-state storage, etc. Each device 110 and/or system 120 may also be connected to removable or external non-volatile memory and/or storage (such as a removable memory card, memory key drive, networked storage, etc.) through respective input/output device interfaces (902/1002).

Computer instructions for operating each device 110 and/or system 120 and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device 110 and/or system 120 includes input/output device interfaces (902/1002). A variety of components may be connected through the input/output device interfaces (902/1002), as will be discussed further below. Additionally, each device 110 and/or system 120 may include an address/data bus (924/1024) for conveying data among components of the respective device. Each component within a device 110 and/or system 120 may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content and/or a camera 818 to capture image data, although the disclosure is not limited thereto.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110 and the system(s) 120 may include their own dedicated processors, memory, and/or storage. Alternatively, one or more of the components of the device(s) 110 and/or the system(s) 120 may utilize the I/O interfaces (902/1002), processor(s) (904/1004), memory (906/1006), and/or storage (908/1008) of the device(s) 110 and system(s) 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110 and the system(s) 120, as described herein, are illustrative, and may be located as a stand-alone device or may be included, in whole or in part, as a component of a larger device or system.

As illustrated in FIG. 11, multiple devices (110a-110h, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a speech-detection device 110b, refrigerator 110c, display device 110d, a smart television 110e, a display device 110f, a headless device 110g (e.g., configured to connect to a television), and/or a device 110h, may be connected to the network(s) 199 through a wireless service provider (e.g., using a WiFi or cellular network connection), over a wireless local area network (WLAN) (e.g., using WiFi or the like), over a wired connection such as a local area network (LAN), and/or the like. Other devices are included as network-connected support devices, such as the system(s) 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for audio type detection, the method comprising:
receiving first audio data from a microphone array of a device, the first audio data corresponding to a first time interval and a second time interval occurring after the first time interval;
generating, using the first audio data, first data corresponding to a first sound source, wherein the first sound source is represented in a first portion of the first audio data;
generating, using the first audio data, second data corresponding to a second sound source, wherein the second sound source is represented in a second portion of the first audio data;
determining, using a wakeword detector, that a third portion of the first audio data received during the second time interval represents a wakeword;
determining a first power value corresponding to a first portion of the first data that is associated with the second time interval;
determining, based on the first portion of the first data, a first confidence value that represents a first likelihood that the first sound source corresponds to the wakeword;

determining a second power value corresponding to a first portion of the second data that is associated with the first time interval;

determining, using the second power value, that noisy conditions are present in an environment of the device;

determining, using the first power value and the first confidence value, a first value that represents a second likelihood that the first sound source corresponds to the wakeword;

determining that the first value exceeds a first threshold value;

associating the wakeword with the first sound source and generating second audio data that corresponds to a fourth portion of the first audio data in response to determining that the first value exceeds the first threshold value; and causing language processing to be performed on the second audio data.

2. The computer-implemented method of claim 1, further comprising:

determining a third power value corresponding to a second portion of the second data that is associated with the second time interval;

determining, using the second portion of the second data, a second confidence value that represents a third likelihood that the second sound source corresponds to the wakeword; and determining, using the second power value and the second confidence value, a second value that represents a fourth likelihood that the second sound source corresponds to the wakeword, wherein the first threshold value is the second value.

3. The computer-implemented method of claim 1, wherein determining that the noisy conditions are present further comprises:

determining, using the first power value and the second power value, that a first number of audio sources are represented in a fifth portion of the first audio data that is associated with the first time interval;

determining that the first number of audio sources exceeds a second threshold value; and determining that noisy conditions are present in the environment during the first time interval.

4. The computer-implemented method of claim 1, further comprising:

determining, based on a second portion of the second data, a second confidence value that represents a third likelihood that the second sound source corresponds to the wakeword, the second portion of the second data corresponding to the second time interval;

determining that the second portion of the second data overlaps third data that includes a representation of the wakeword; and determining a third confidence value corresponding to the second portion of the second data, the third confidence value less than the second confidence value.

5. A computer-implemented method, the method comprising:

receiving first data, the first data corresponding to a first time interval and a second time interval after the first time interval;

generating, using the first data, second data corresponding to a first audio source, wherein the first audio source is represented in a first portion of the first data;

generating, using the first data, third data corresponding to a second audio source, wherein the second audio source is represented in a second portion of the first data;

determining that a third portion of the first data comprises a representation of a first event, the third portion of the first data corresponding to the second time interval;

determining a first power value corresponding to a first portion of the second data that is associated with the second time interval;

determining, based on the first portion of the second data, a first confidence value that represents a first likelihood that the first sound source corresponds to the first event;

determining that one or more first conditions are present during the first time interval;

determining, using the one or more first conditions, first weight values;

determining, using the first power value, the first confidence value, and the first weight values, a first value that represents a second likelihood that the first sound source corresponds to the first event;

determining that the first value satisfies a threshold; and associating the first event with the first audio source in response to determining that the first value satisfies the threshold.

6. The computer-implemented method of claim 5, further comprising:

determining a second power value corresponding to a portion of the third data, wherein the portion of the third data is associated with the second time interval;

determining, based on the portion of the third data, a second confidence value that represents a third likelihood that the second sound source corresponds to the first event; and determining, using the second power value, the second confidence value, and the first weight values, a second value that represents a fourth likelihood that the second sound source corresponds to the first event, wherein the threshold is the second value.

7. The computer-implemented method of claim 5, wherein determining the first value further comprises:

determining a first product between the first power value and a first weight value of the first weight values;

determining a second product between the first confidence value and a second weight value of the first weight values;

determining a third product between a correlation value and a third weight value of the first weight values, wherein the correlation value indicates a similarity between the first portion of the second data and fourth data that includes the representation of the first event; and determining the first value using the first product, the second product, and the third product.

8. The computer-implemented method of claim 5, wherein determining that the one or more first conditions are present further comprises:

determining a second power value corresponding to a portion of the third data, wherein the portion of the third data is associated with the first time interval;

determining, using the second power value, that a first number of audio sources are represented in a fourth portion of the first data, wherein the fourth portion of the first data corresponds to the first time interval;

determining that the first number of audio sources exceeds a threshold value; and determining that noisy conditions are present in an environment during the first time interval.

9. The computer-implemented method of claim 5, further comprising:
generating, using the first data, fourth data;
determining that the second data corresponds to a first track and represents direct sound waves associated with the first audio source;
determining that the fourth data corresponds to a second track and represents reflected sound waves associated with the first audio source;
determining a first number of tracks represented in a fourth portion of the first data, the fourth portion of the first data corresponding to the first time interval, the first number of tracks corresponding to direct sound waves and including the first track; and
determining a second number of tracks represented in the fourth portion of the first data, the second number of tracks corresponding to reflected sound waves and including the second track.

10. The computer-implemented method of claim 5, wherein determining that the one or more first conditions are present further comprise determining that a first noise level corresponding to the third portion of the first data is below a threshold value, and the method further comprises:
determining a second noise level corresponding to a fourth portion of the first data, wherein the fourth portion of the first data corresponds to a third time interval after the second time interval;
determining that the second noise level is above the threshold value; and
determining second weight values that are different than the first weight values.

11. The computer-implemented method of claim 5, further comprising:
determining, based on a portion of the third data, a second confidence value that represents a third likelihood that the second sound source corresponds to the first event;
determining that the portion of the third data overlaps fourth data that includes the representation of the first event; and
determining a third confidence value that represents a fourth likelihood that the second sound source corresponds to the first event, the third confidence value less than the second confidence value.

12. The computer-implemented method of claim 5, further comprising:
receiving first audio data corresponding to the first data;
generating, using the first audio data and the second data, second audio data that represents the first audio source; and
causing language processing to be performed on the second audio data.

13. A system comprising:
at least one processor; and
memory including instructions operable to be executed by the at least one processor to cause the system to:
receive first data, the first data corresponding to a first time interval and a second time interval after the first time interval;
generate, using the first data, second data corresponding to a first audio source, wherein the first audio source is represented in a first portion of the first data;
generate, using the first data, third data corresponding to a second audio source, wherein the second audio source is represented in a second portion of the first data;
determine that a third portion of the first data comprises a representation of a first event, the third portion of the first data corresponding to the second time interval;
determine a first power value corresponding to a fourth portion of the first data, the fourth portion of the first data corresponding to the first time interval;
determine, based on the first power value, that noisy conditions are present in an environment of the device;
determine first weight values corresponding to two or more input features in response to determining that noisy conditions are present in the environment of the device;
determine, based on the first weight values and the two or more input features, a first value that represents a first likelihood that the first sound source corresponds to the first event;
determine that the first value satisfies a first threshold; and
associate the first event with the first audio source in response to determining that the first value satisfies the first threshold.

14. The system of claim 13, wherein the memory further comprises instructions that, when executed by the at least one processor, further cause the system to:
determine a second power value corresponding a portion of the third data;
determine, based on the portion of the third data, a second confidence value that represents a second likelihood that the second sound source corresponds to the first event;
determine, based on the second power value, the second confidence value, and the first weight values, a second value that represents a fourth likelihood that the second sound source corresponds to the first event; and
determine that the first value is greater than the second value.

15. The system of claim 13, wherein the memory further comprises instructions that, when executed by the at least one processor, further cause the system to:
determine a first product between a second power value and a first weight value of the first weight values, the second power value corresponding to a portion of the second data;
determine a second product between a second confidence value and a second weight value of the first weight values, the second confidence value corresponding to the portion of the second data;
determine a third product between a correlation value and a third weight value of the first weight values, wherein the correlation value indicates a similarity between the portion of the second data and fourth data that includes the representation of the first event; and
determine the first value using the first product, the second product, and the third product.

16. The system of claim 13, wherein the memory further comprises instructions that, when executed by the at least one processor, further cause the system to:
determine a second power value corresponding to a portion of the third data, wherein the portion of the third data is associated with the first time interval;
determine, using the second power value, that a first number of audio sources are represented in the fourth portion of the first data;
determine that the first number of audio sources exceeds a threshold value; and
determine that the noisy conditions are present in the environment during the first time interval.

17. The system of claim 13, wherein the memory further comprises instructions that, when executed by the at least one processor, further cause the system to:
- generate, using the first data, fourth data;
- determine that the second data corresponds to a first track and represents direct sound waves associated with the first audio source;
- determine that the fourth data corresponds to a second track and represents reflected sound waves associated with the first audio source;
- determine a first number of tracks represented in the fourth portion of the first data, the first number of tracks corresponding to direct sound waves and including the first track; and
- determine a second number of tracks represented in the fourth portion of the first data, the second number of tracks corresponding to reflected sound waves and including the second track.

18. The system of claim 13, wherein the memory further comprises instructions that, when executed by the at least one processor, further cause the system to:
- determine a second power level corresponding to a fifth portion of the first data, the fifth portion of the first data corresponding to a third time interval after the second time interval;
- determine that the second power level is below a threshold value;
- determine that the noisy conditions are not present in the environment; and
- determine second weight values corresponding to the two or more input features, wherein the second weight values are different than the first weight values.

19. The system of claim 13, wherein the memory further comprises instructions that, when executed by the at least one processor, further cause the system to:
- determine, based on a portion of the third data, a second confidence value that represents a second likelihood that the second sound source corresponds to the first event;
- determine that the portion of the third data overlaps fourth data that includes the representation of the first event; and
- determine a second confidence value that represents a third likelihood that the second sound source corresponds to the first event, wherein the third confidence value is less than the second confidence value.

20. The system of claim 13, wherein the memory further comprises instructions that, when executed by the at least one processor, further cause the system to:
- receive first audio data corresponding to the first data;
- generate, using the first audio data and the second data, second audio data that represents the first audio source; and
- cause language processing to be performed on the second audio data.

* * * * *